(12) United States Patent
Shimomura et al.

(10) Patent No.: US 6,473,858 B1
(45) Date of Patent: Oct. 29, 2002

(54) METHOD AND APPARATUS FOR BROADCASTING DATA WITH ACCESS CONTROL

(75) Inventors: Tsutomu Shimomura, Incline Village, NV (US); Steve Waltman, Boulder, CO (US); Mark Peting, Tigard, OR (US); Castor Fu, Menlo Park, CA (US); Dag H. Johansen, Palo Alto, CA (US); Geoff Mulligan, Colorado Springs, CO (US)

(73) Assignee: Digeo, Inc., Kirkland, WA (US)

( * ) Notice: Subject to any disclaimer, the term of this patent is extended or adjusted under 35 U.S.C. 154(b) by 0 days.

(21) Appl. No.: 09/293,079

(22) Filed: Apr. 16, 1999

(51) Int. Cl.[7] .................................................. G06F 1/24
(52) U.S. Cl. ...................................... 713/150; 713/161
(58) Field of Search .............................. 713/150, 161, 713/166, 171

(56) References Cited

U.S. PATENT DOCUMENTS

| | | |
|---|---|---|
| 4,958,230 A | 9/1990 | Jonnalagadda et al. |
| 5,029,003 A | 7/1991 | Jonnalagadda |
| 5,184,218 A | 2/1993 | Gerdes |
| 5,200,715 A | 4/1993 | Gerdes et al. |
| 5,247,575 A | 9/1993 | Sprague et al. |
| 5,327,237 A | 7/1994 | Gerdes et al. |
| 5,351,293 A | 9/1994 | Michener et al. |
| 5,387,941 A | 2/1995 | Montgomery et al. |
| 5,410,360 A | 4/1995 | Montgomery |
| 5,457,714 A | 10/1995 | Engel et al. |
| 5,550,576 A | 8/1996 | Klosterman |
| 5,557,333 A | 9/1996 | Jungo et al. |
| 5,559,559 A | 9/1996 | Jungo et al. |
| 5,572,247 A | 11/1996 | Montgomery et al. |
| 5,577,042 A | 11/1996 | McGraw et al. |
| 5,585,858 A | 12/1996 | Harper et al. |
| 5,615,264 A | 3/1997 | Kazmierczak et al. |
| 5,615,338 A | 3/1997 | Poole et al. |
| 5,617,148 A | 4/1997 | Montgomery |
| 5,617,565 A | 4/1997 | Augenbraun et al. |
| 5,632,007 A | 5/1997 | Freeman |
| 5,671,283 A | 9/1997 | Michener et al. |
| 5,671,377 A | 9/1997 | Bleidt et al. |
| 5,684,525 A | 11/1997 | Klosterman |
| 5,691,986 A | 11/1997 | Pearlstein |
| 5,708,476 A | 1/1998 | Myhrvold et al. |
| 5,724,091 A | 3/1998 | Freeman et al. |
| 5,731,841 A | 3/1998 | Rosenbaum et al. |
| 5,739,866 A | 4/1998 | Kim et al. |
| 5,742,357 A | 4/1998 | Griesbaum |
| 5,745,185 A | 4/1998 | Portron et al. |
| 5,748,789 A | 5/1998 | Lee et al. |
| 5,758,258 A | 5/1998 | Shoff et al. |
| 5,761,606 A | 6/1998 | Wolzien |
| 5,764,762 A | 6/1998 | Kazmierczak et al. |

(List continued on next page.)

OTHER PUBLICATIONS

MediaStorm II Brochure, Jul. 5, 1999, 2 pages, from NDS.
Business at the speed of thought Brochure, Oct. 10, 1998, 11 pages, Cyberstar, A Loral Company.

(List continued on next page.)

Primary Examiner—Thomas R. Peeso
(74) Attorney, Agent, or Firm—Blakely, Sokoloff, Taylor & Zafman

(57) ABSTRACT

A data broadcasting system is disclosed. The data broadcasting system operates by receiving source material from a number of different sources. The source material is processed by performing adding error correction encoding and in some cases, encryption. The source material from the different sources is then multiplexed together and broadcast on a broadcast medium. The multiplexed digital broadcast is received by a plurality of receiver systems. The receiver systems demultiplex the multiplexed digital stream to obtain desired digital streams. The desired streams are then decrypted if necessary.

43 Claims, 15 Drawing Sheets

U.S. PATENT DOCUMENTS

| | | |
|---|---|---|
| 5,774,172 A | 6/1998 | Kapell et al. |
| 5,774,664 A | 6/1998 | Hidary et al. |
| 5,778,181 A | 7/1998 | Hidary et al. |
| 5,778,187 A | 7/1998 | Monteiro et al. |
| 5,781,228 A | 7/1998 | Sposato |
| 5,790,198 A | 8/1998 | Roop et al. |
| 5,797,001 A | 8/1998 | Augenbraun et al. |
| 5,805,763 A | 9/1998 | Lawler et al. |
| 5,815,145 A | 9/1998 | Matthews, III |
| 5,815,195 A | 9/1998 | Tam |
| 5,825,927 A | 10/1998 | Boyce et al. |
| 5,828,839 A | 10/1998 | Moncreiff |
| 5,828,945 A | 10/1998 | Klosterman |
| 5,831,679 A | 11/1998 | Montgomery et al. |
| 5,857,181 A | 1/1999 | Augenbraun et al. |
| 5,861,881 A | 1/1999 | Freeman et al. |
| 5,861,906 A | 1/1999 | Dunn et al. |
| 5,867,657 A | 2/1999 | Bolosky et al. |
| 5,874,985 A | 2/1999 | Matthews, III |
| 5,896,414 A | 4/1999 | Meyer et al. |
| 5,900,905 A | 5/1999 | Shoff et al. |
| 5,903,563 A | 5/1999 | Rashid et al. |
| 5,903,673 A | 5/1999 | Wang et al. |
| 5,907,323 A | 5/1999 | Lawler et al. |
| 5,913,038 A | 6/1999 | Griffiths |
| 5,918,002 A | 6/1999 | Klemets et al. |
| 5,923,328 A | 7/1999 | Griesmer |
| 5,923,362 A | 7/1999 | Klosterman |
| 5,945,987 A | 8/1999 | Dunn |
| 5,953,012 A | 9/1999 | Veghte et al. |
| 5,959,508 A | 9/1999 | Aitken |
| 5,966,637 A | 10/1999 | Kanungo et al. |
| 5,983,005 A | 11/1999 | Monteiro et al. |
| 6,006,256 A | 12/1999 | Zdepski et al. |

OTHER PUBLICATIONS

Broadband Technology Choices Brochure, Mar. 24, 1998, 7 pages, Cyberstar, A Loral Company.

Why satellite–based high–speed communications makes sense, Mar. 24, 1998, 4 pages, Cyberstar.

Cyberstar Brochure, Cyberstar L.P., Oct. 9, 1998, 11 pages.

MediaStream MRX–2 PC–DVB Satellite Reciever Card Brochure, Media4, Inc., Aug. 1998, 2 pages.

MediaStream MRX–3 PC–DVB Satellite Reciever Card Brochure, Media4, Inc., Aug. 1998, 2 pages.

MediaStream IP–DVB Gateway Brochure, Media4, Inc., May 1998, 2 pages.

MediaStream Network Control System Brochure, Media4, Inc., May 1998, 2 pages.

MediaStream Broadcast Server Brochure, Media4, Inc., May 1998, 2 pages.

METHOD AND APPARATUS FOR BROADCASTING DATA WITH ACCESS CONTROL

RELATED APPLICATIONS

This patent application is related to a patent application entitled "A Broadband Data Broadcasting Service" having Ser. No. 09/293,594, filed concurrently with this application.

FIELD OF THE INVENTION

The present invention relates to the field of digital communications. In particular the present invention discloses a packet switched digital broadcast communication system for broadcasting digital data with privacy and access control features.

BACKGROUND OF THE INVENTION

The Internet has become the standard system for allowing different computer systems communicate. The Internet consists of a global interconnection of computer networks that share a common suite of communication protocols. Specifically, all the computers on the Internet communicate using the Transport Control Protocol and the Internet Protocol (TCP/IP).

The very popular global Internet has made the well-known Transport Control Protocol and Internet Protocol (TCP/IP) into the de facto standard digital communication protocol. However, TCP/IP was originally designed for one to one, sender to receiver, communication. As the popularity of the Internet has gained, the data traffic load on the Internet has greatly increased. Due to the popularity of the Internet and its rapid growth, it is common to experience Internet "Brown-outs" caused by data traffic jams. To facilitate data communication, several methods of avoiding these data traffic jams have been devised.

One method of avoiding the problems is to create a private "intranet." An intranet is a privately owned and used computer network that uses Internet protocols such as TCP/IP. Creating a private intranet is a very expensive proposition. Thus, the technique of creating private intranets to relieve traffic problems is only practical for cost insensitive projects.

It is well known that much of the traffic carried by the global Internet is redundant information. For example, millions of World Wide Web viewers access the same web pages and the same video streams from popular World Wide Web sites. For example, many people retrieve the same news information from the CNN interactive located at http://www.cnn.com/. Such popular World Wide Web sites therefore send the same web pages and the same video streams to the millions of World Wide Web viewers on individual unicast transport connections. All of these individual unicast streams create a large amount of redundant Internet traffic.

To help reduce data traffic jams caused by redundant information streams, a multicast protocol was created for the Internet. The Internet multicast protocol uses a single data stream to carry the same information to multiple recipients. Each new recipient "subscribes" to a desired multicast stream. When a new multicast protocol recipient subscribes to a multicast stream, the upstream routers that couple the recipient to the multicast stream begin routing a copy of the desired multicast stream to the network that the new recipient is attached to.

Internet multicasting promises to reduce Internet traffic by eliminating redundant information streams. However, there are several problems associated with Internet multicasting. One large problem is that Internet multicasting is currently not well supported by much of the current Internet infrastructure. For example, many of the older routers and switches on the Internet do not support multicast routing. Another problem with Internet multicasting is that there are very few quality-of-service guarantees for Internet traffic such that multicast streams are not guaranteed reliable service. Yet another problem with Internet multicasting is that there is no inherent data security or access control for multicast streams such that any entity can tap into and monitor Internet multicast streams.

Due to the above described and other problems associated with Internet multicasting, the popularity of Internet multicasting has been limited. Therefore, the number of software applications that support the Internet multicast protocol is limited. Although Internet multicast shows promise, it would be desirable to have improved methods of delivering Internet multicast information.

SUMMARY OF THE INVENTION

The present invention discloses a directed data broadcast system. The directed data broadcast system operates by accepting a plurality of data streams from a plurality of different data origination sources at a centralized data broadcast center. The data broadcast center processes the incoming data streams by encrypting, addressing, and multiplexing the data streams into a single combined data stream. The combined data stream is then modulated and broadcast on a broadcast medium such as radio frequency. A plurality of receiver systems receive the signal broadcast across the broadcast communication medium. Each receiver demodulates the broadcast signal to retrieve the combined data stream. The receiver then selects packets addressed for that particular receiver or a group to which the receiver belongs. The selected packets are decrypted and multicast on a LAN coupled to the receiver to deliver to an application.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

A method and apparatus for a directed data broadcast system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Internet multicasting. However, the same techniques can easily be applied to other types of data communication protocols.

Overview of a Directed Broadcast System

Figure 1:
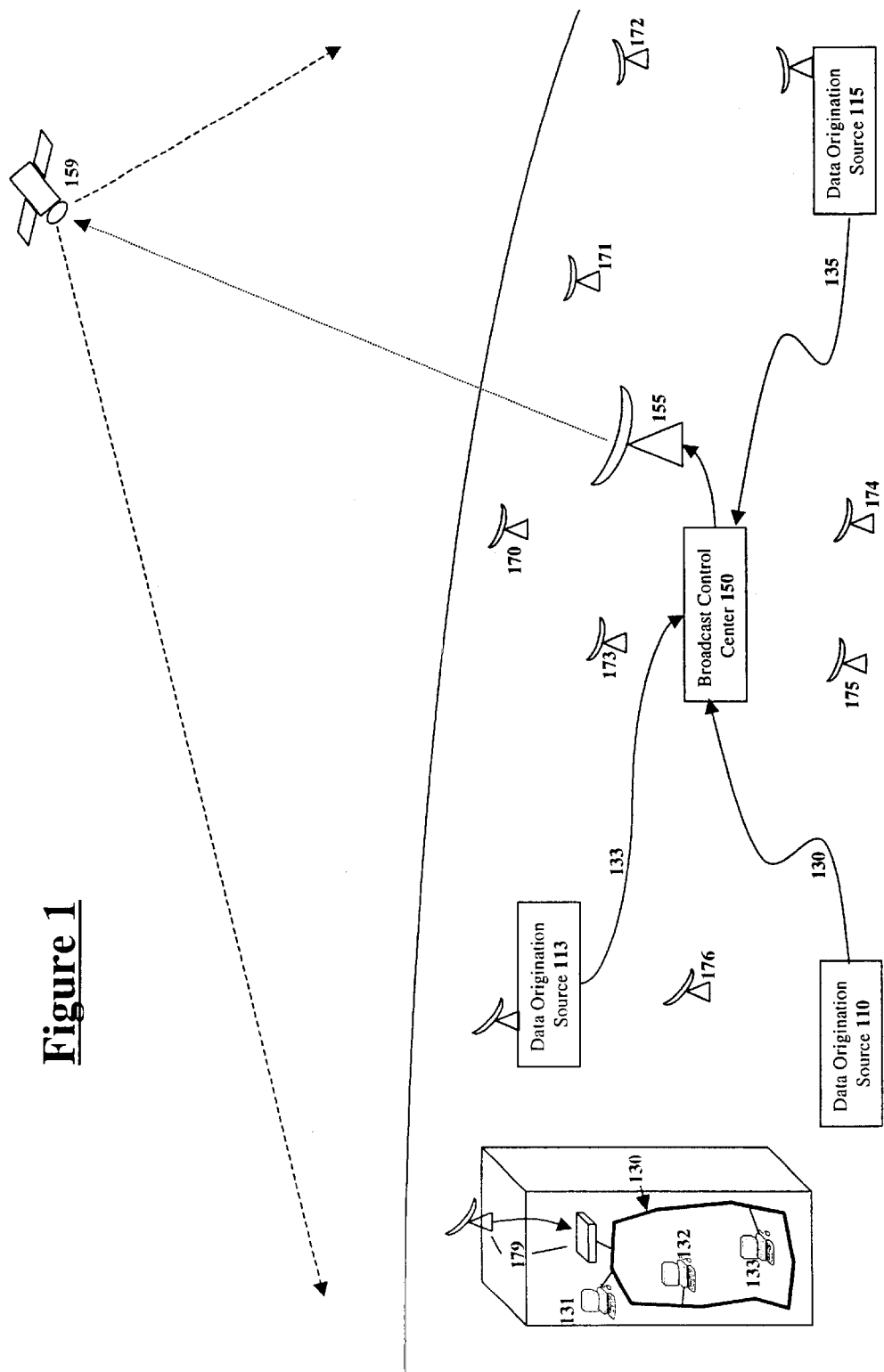
FIG. 1 illustrates one embodiment of a directed broadcast data distribution system.

FIG. 1 illustrates one embodiment of the directed data broadcast system of the present invention. A description of the overall directed data broadcast system is provided with reference to FIGS. 1 and 1. Each individual element disclosed in FIG. 1 will later be described in greater detail.

Referring to FIG. 1, a first data origination source 110 transmits a digital information stream to a data broadcast facility 150 along a data communication channel 130. The data origination source 110 may be any entity that wishes to publicly or privately broadcast data over a broadcast medium. The digital information stream may start and stop at any time. Furthermore, the data rate of the digital information may vary. In one embodiment, the digital information stream comprises a set of IP data packets.

The broadcast facility 150 processes the incoming digital information stream from data origination source 110 by encrypting the information, adding addressing header information, and adding error correction coding. The broadcast facility 150 multiplexes the received digital information stream from data origination source 110 with digital information streams from other sources such as data origination source 113 and data origination source 115 to create a final multiplexed digital information stream.

After encrypting, addressing, and multiplexing the digital information streams into a single broadcast stream, the broadcast facility 150 then modulates the multiplexed digital information stream onto a digital broadcast signal and then transmits the digital broadcast signal on a broadcast distribution medium. In the particular embodiment illustrated in FIG. 1, a direct video broadcast (DVB) satellite system is used to broadcast the digital broadcast signal to a large number of receiving sites. However, it should noted that many other types of broadcast media can be used such as ATSC television signals, cable television signals, radio frequency broadcasts, or any other suitable broadcast medium.

At each receiving site is a receiver system such as receiver 171 constructed to receive the digital broadcast signal. The receiver system 171 demodulates the digital broadcast signal to retrieve the multiplexed digital information stream. The receiver system 171 then examines the address portion of data packets in the multiplexed digital information stream for addressing information. If the receiver system 171 determines that it is interested in a particular data packet then the receiver decrypts the data packet. The receiver system 171 may be interested if the address specifies a multicast group to which the receiver system 171 belongs. The decrypted data packet is then used locally at the receiver system's site.

In one possible embodiment, the receiver system may distribute the decrypted data in multicast Internet Protocol (IP) form on a local area network (LAN) if requested by any multicast subscribers on the LAN. Specifically, receiver system 179 receives and decodes the multiplexed broadcast signal. The receiver system 179 then rebroadcasts a subset of the received data onto an internal LAN 130 such that the information stream is made available to client systems 131, 132, and 133. Furthermore, the receiver system 179 may cache the digital information received.

It can be seen from the embodiment illustrated in FIG. 1 that the present invention introduces a secure "packet switched" satellite network service. Any entity that wishes to broadcast information can simply establish a paid account with the data broadcast facility 150 and then transmits the digital information to be broadcast to the data broadcast facility 150. In the information to be broadcast is private, the data broadcast facility 150 will encrypt the information appropriately such that only receivers that the sender wishes to broadcast to will be able to decrypt the information. If the information to be broadcast is public, then the data broadcast facility 150 will not encrypt the information. The data broadcast facility 150 may still request payment for the broadcast of public information. For example, advertisements, brochures, electronic catalogs and other "public" information may be broadcast by the data broadcast facility 150 for a fee.

The Data Origination Source

The data origination source 110 consists of any entity that wishes to distribute digital information. The digital information to be distributed may be information that the data origination source 110 wishes to freely distribute to any recipient capable of receiving the digital broadcast signal. Alternatively, the information to be distributed may be highly confidential such that the information needs to be protected.

Examples of information that does not need protection include freeware and shareware software, advertising, advertising supported programming, demonstration software, etc. With such non-confidential information, the data origination source 110 can transmit the information to the broadcast facility 150 using any available data communication means. For example, the data origination source 110 may transmit the information to be distributed to the broadcast facility 150 using the global Internet. The Internet provides an inexpensive data transport system. Alternatively, any other wired or wireless transmission media may be used.

In other situations, the information to be distributed needs to be kept secure. For example, a corporation with multiple geographically distributed franchises may wish to distribute trade secret information to some or all of its distributed franchise locations. In such a situation, the information needs to be securely transmitted to the broadcast facility 150. One method of transmitting the information securely would be to use a dedicated secure communication line between the data origination source 110 and the broadcast facility 150.

Alternatively, the data origination source 110 may encrypt the information using an encryption means that only desired recipients could decrypt. The data origination source 110 could then transmit the encrypted data stream using any type of communication link since any eavesdropper would not be able to use the encrypted information. Thus, if a data origination source encrypts data before transmission to the central broadcast facility, a wireless media that may be intercepted such as a point to point microwave link can be used to carry the information stream. Similarly, encrypted data can be transmitted across the Internet to the central broadcast facility.

Information Stream Processing at the Broadcast Facility

The broadcast facility serves two main functions. First, the broadcast facility processes several incoming digital information streams and multiplexes the individual processed incoming digital information streams to generate a single unified output digital information stream. Second, the broadcast facility broadcast the multiplexed digital information stream to a plurality of recipients across a broadcast distribution medium.

Stream Accounting

When the broadcast control center 150 receives each digital information stream, the broadcast control center 150 counts the number of bytes that are received. Furthermore, the broadcast control center 150 notes the requested quality of service level for the received bytes. Encryption may also be added to private data streams for an additional fee. A combination of the amount of data received, the quality of service level provided, and the encryption security level provided may be used by the broadcast control center 150 to generate an amount of money to charge the sender for broadcasting the information.

Data Encapsulation

The broadcast media being used will have its own data packet structure. Thus, the information streams must be divided into logical blocks for encapsulation into the particular transport protocol that is selected. Since the original packets of the source digital information stream may be larger or smaller than packets of the transport protocol stream, the broadcasting center must determine how to divide or group the source packets and organize the packets into transport protocol packets.

In one embodiment that distributes Internet Protocol on a direct video broadcast (DVB) satellite media, the Internet Protocol packets are encapsulated into MPEG-2 transport frames. The variable length IP packets must be divided up or grouped together to fit into one hundred and eighty-eight (188) byte MPEG-2 transport frames.

The encapsulated packets may be sent out of the original order. Depending upon the type of encapsulated packets used, the encapsulated packets may or may not need to be resorted into the original order. For example, in a preferred Internet Protocol (IP) packet embodiment, there is no need to restore the original IP packet order since Internet Protocol (IP) packets are not guaranteed to arrive in the same order that such IP packets were transmitted.

Encryption

As previously set forth, only certain recipients should receive certain digital information streams that have been designated as confidential. The data origination source 110 or the broadcast facility 150 may specify which recipients should be able to receive the digital information stream. Once the group of permissible recipients is determined, the broadcast facility 150 encrypts the digital information stream in a manner that allows all members of the intended group to decrypt the digital information stream. However, no other recipients should be able to decrypt the restricted digital information stream.

Data encryption provides several very useful features to the system of the present invention. First, data encryption provides privacy. By encrypting the information streams, only the desired recipients will be able to read and use an encrypted digital information stream.

Encryption can also be used to provide authenticity. For example, an information stream may be encrypted with a private-key in a public-key encryption system such that a recipient can authenticate the identity of the sender by decrypting the message with the alleged sender's public key.

One of the most important features that encryption also provides to the present invention is a means of performing access control. Specifically, a set of authorized recipients can be created such that only those recipients can access a particular encrypted digital information stream. Thus, the encryption can be used to create paid subscriber systems.

In one encryption embodiment, an access control system is implemented using private group keys. A private group key is an encryption key that is distributed to all the member of a group of intended recipients. If the group of intended recipients do not yet share a common group key, then the broadcast facility 150 generates a new private group key and sends out the new private group key to the group of intended recipients. Each member of the group of intended recipients receives the private group key in encrypted form using an encryption key (public or private) for that recipient. No other recipients will receive the private group key. Once all members of the intended group are sent the private group key, then the broadcast facility 150 encrypts the information using the private group key.

In one embodiment, the SKIP encryption system was selected. The SKIP encryption system was selected since SKIP can use a one-way transmission path (broadcast) for key distribution.

If the information to be broadcast is not confidential, then the information does not need to be encrypted. However, the information may be compressed for greater coding efficiency.

Addressing

After the broadcast facility 150 encrypts an incoming digital information stream (if necessary), the encrypted digital information stream must then be addressed such that the intended recipients can recognize the digital information stream. In one embodiment, the encryption system also serves as an addressing means since only those recipients having the proper encryption keys will be able to decrypt packets.

In another embodiment, the broadcast facility 150 adds header information to the transport layer's packet that identifies a specific recipient or a group of recipients. This header represents a first layer of addressing. In an MPEG-2 transport layer embodiment, the thirteen-bit program identification (PID) field may be used for this top layer addressing.

In one embodiment, a group of recipients is addressed by using an address value that is an irreversible one-way transformation of the private group key. In such a system, the receiver systems created transformed versions of the group keys for the groups that the receivers belong. When incoming packets are received, the receiver systems compare the transformed versions of their private group keys with the first layer address field. When a receiver system detects a match, it then proceeds to decode the packet.

Non confidential unencrypted information can be addressed in a variety of different ways. For example, non-confidential information that is intended for a particular group recipients can be addressed using a group address wherein that group address is sent to individual group members before transmission of the information.

Non confidential information that is destined for any recipients can be sent to a "public" broadcast address. Alternatively, non-confidential information that is destined for any recipient can also be addressed using a set of well defined public group addresses that are associated with different types of freely available information. For example, freeware or shareware software can be addressed to with a public address that denotes freeware or shareware information. In one implementation, the public group addresses are implemented using an Internet Protocol multicast address.

The system of the present invention may use existing addressing systems in the transports protocol to build a hierarchical addressing system. For example, in an MPEG-2 transport based system, the program identification (PID) field can be used as a first layer addressing system that works in conjunction with subsequent lower layer address such as a group address. In one such embodiment, the broadcast facility 150 assigns each recipient group to particular PID value. Then the broadcast facility 150 informs each member of the group the PID value that must be examined. Multiple groups can be assigned to the same PID. Ideally, the groups to which recipients belong will be orthogonal such that MPEG-2 transport frames from certain PID values can immediately be discarded. One good method using such a hierarchical addressing system is to assign public streams to a single public PID value and private confidential streams to individual PID values. In this manner, most receivers will "subscribe" to just the public PID value and one or two private PID values.

Forward Error Correction Encoding

Since the present invention transmits a digital information stream across a unidirectional broadcast medium, the system of the present invention goes to great lengths to ensure that information that is broadcast will be received intact by the receiver systems. To help obtain this goal, the present invention uses forward error correction.

In one embodiment of the present invention, the individual digital information streams are each encoded with a forward error correction (FEC) coding system. By performing the forward error correction coding on an individual digital information stream basis, the present invention can provide different levels of data integrity to the different digital information streams. In this manner, the broadcast facility can charge a higher fee to a customer that requests a very reliable data stream that requires a larger amount of redundant information to ensure data integrity.

There are many different well-known forward error correction encoding systems that may be used by the broadcast system of the present invention. In one embodiment, a variation of the well-known Reed-Solomon forward error correction encoding system is used. Furthermore, it is important to implement data interleaving to reduce the effect of burst errors on the data stream.

Data Shaping and Multiplexing

Figure 2:
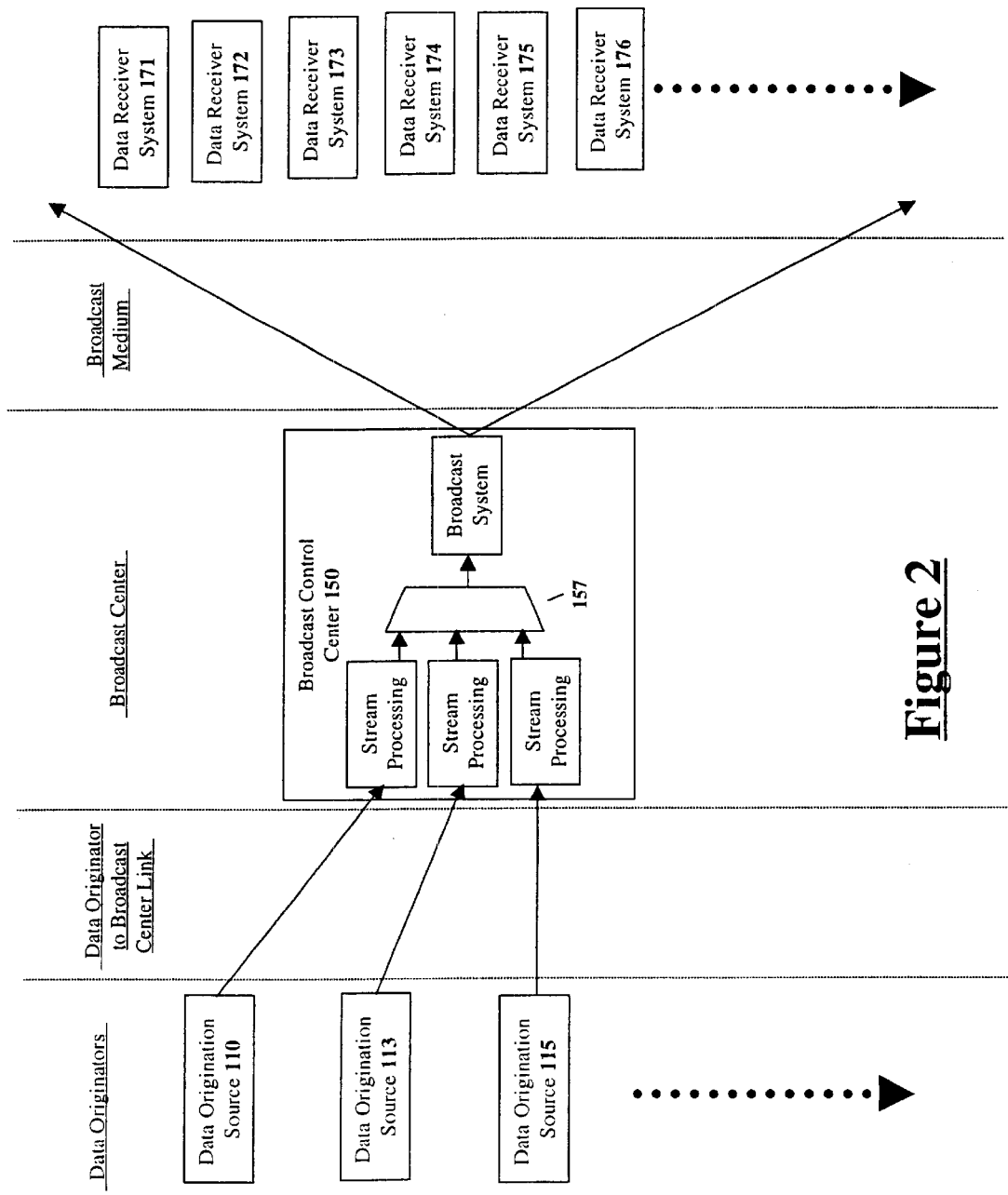
FIG. 2 illustrates a block diagram of the broadcast facility functions.

As illustrated in FIGS. 1 and 2, the broadcast facility 150 receives digital information streams from many different data origination sources. The rate at which the digital information streams are received by the broadcast facility 150 may occasionally exceed the rate at which the multiplexed digital information stream is broadcast. Furthermore, the relative priority of the digital information streams received by the broadcast facility 150 may require the digital information streams to be broadcast in a different order than which the digital information streams are received. For example, a video or audio stream may require a constant flow of data such that a real-time video or audio presentation may be transmitted. In such a case, the video or audio stream of data would have priority over the transmission of a database. To handle such requirements, the broadcast facility 150 of the present invention includes a sophisticated multiplexing unit 157.

Each data origination source (110, 113, 115, . . . ) that transmits a digital information stream to the broadcast center 150 assigns a quality-of-service (QoS) level to the digital information stream. The assigned quality-of-service level may specify particular bandwidth and latency requirements. Note that each data origination source may generate several digital information streams wherein each digital information stream has a different assigned quality-of-service level.

The multiplexing unit 157 receives the various processed digital information streams and multiplexes the various processed digital information streams together taking into account the assigned quality-of-service level of each information stream. Specifically, the multiplexing unit 157 attempts to ensure that the various bandwidth and latency requirements of each information stream are honored. Thus, the multiplexing unit 157 will ensure that real-time information streams with low latency requirements such as video streams will receive priority over bulk data transfers.

In one embodiment, the "RSVP" reservation protocol for the Internet Protocol is used to specify quality of services levels. The RSVP reservation protocol is defined in the Internet Engineering Task Force (IETF) Request For Comments (RFC) documents numbered 2205 to 2212.

After encrypting, addressing, forward error correction encoding, and multiplexing the incoming digital information streams into an output multiplexed digital information stream, the output multiplexed digital information stream is ready for broadcast on a broadcast medium. In a preferred embodiment, the output multiplexed digital information stream is formatted as an MPEG-2 transport stream. It should be noted that only one possible implementation of information stream processing has been disclosed. Many other possible information stream processing implementations exist. For example, the order in which the various information stream processing steps are performed may vary.

Broadcasting from the Broadcast Facility

The broadcast facility 150 broadcasts the output multiplexed digital information stream on a broadcast communication medium that reaches a larger number of receiver systems. In the embodiment of FIG. 1, the broadcast medium is a direct video broadcast (DVB) satellite television system. However, other broadcast media can be used such as terrestrial radio frequency broadcast, terrestrial digital television broadcasts, and cable television distribution.

Direct Video Broadcast Satellite Distribution

There are several possible methods of broadcasting using direct video broadcast (DVB) satellite systems. Four methods that will be disclosed are: (1) using another party's DVB satellite system, (2) sharing a satellite transponder, (3) using a dedicated satellite transponder, or (4) using several satellite transponders.

Figure 3A:
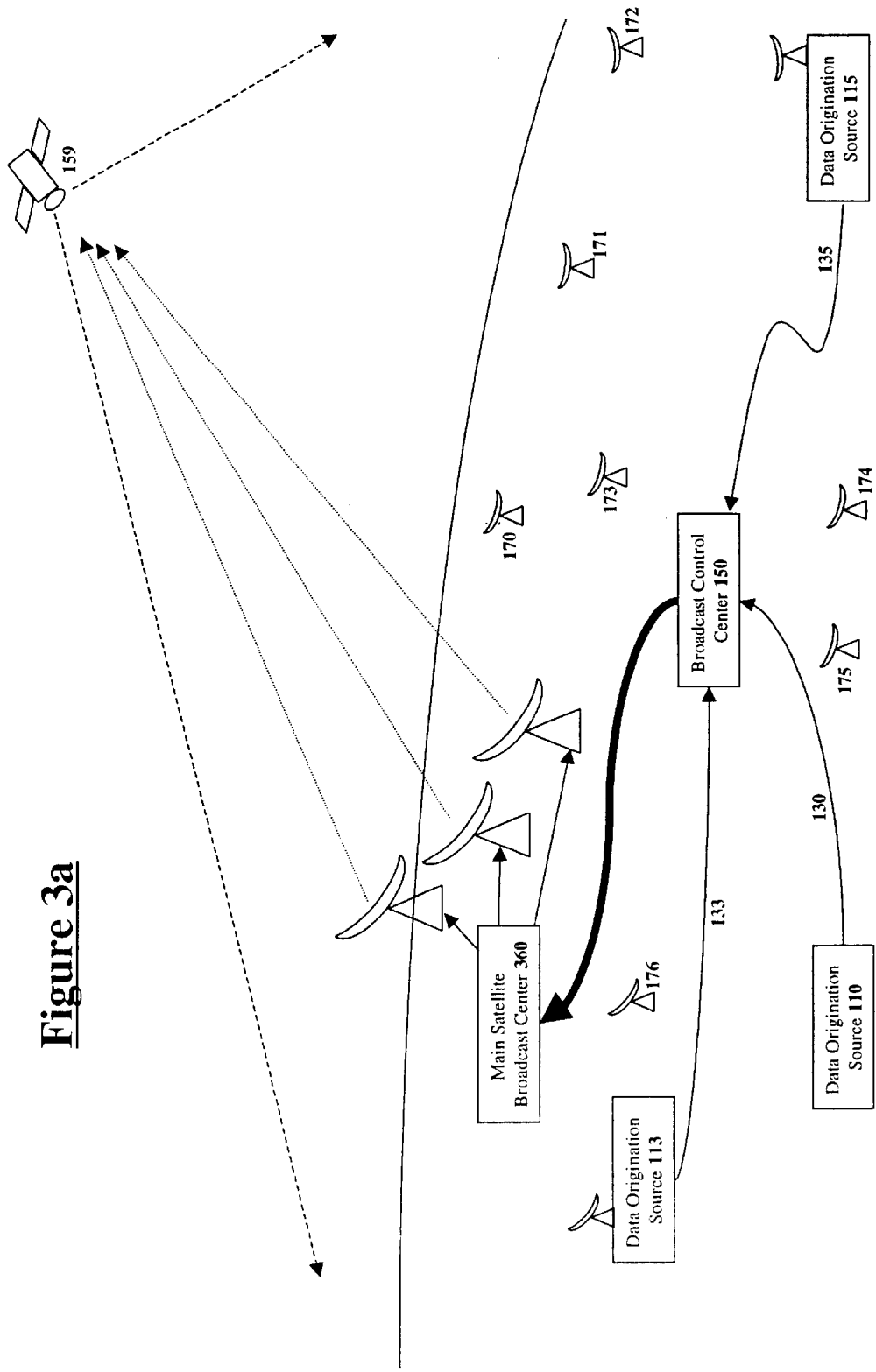
FIG. 3a illustrates a first satellite arrangement for data broadcasting wherein extra bandwidth is purchased from another party's DVB satellite.

FIG. 3a illustrates a first method of broadcasting using a DVB satellite system wherein extra bandwidth on an existing DVB "channel" satellite is used. In most DVB satellite systems, the direct video broadcast satellite broadcasts digital video information encoded in a format known as MPEG-2 video encoding. The MPEG-2 encoded video is then multiplexed along with encoded digital audio and control information. The combined digital video, audio, and control stream is transmitted using a transmission protocol known as MPEG-2 transport protocol. Detailed information about the MPEG-2 Transport protocol can be found in the International Standards Organization document identified as ISO/EEC 13818-1.

A contractual arrangement can be made with an existing direct video broadcast satellite operator wherein the data to be broadcast is encoded into an MPEG-2 transport stream and provided to the satellite operator. Referring to FIG. 3a, a broadcast facility 150 transmits an MPEG-2 encoded transport stream to a direct broadcast satellite television operator 360. The direct broadcast satellite television operator 360 then multiplexes the MPEG2 transport stream along with other MPEG2 transport streams from various television programs and transmits the multiplexed MPEG-2 transport stream to a satellite in geosynchronous orbit within the Clarke belt. The satellite rebroadcasts the MPEG-2 transport stream to millions of receiver systems. A receiver system for the broadcasting system of the present invention would demultiplex the signal and extract the MPEG-2 encoded transport stream that was sent by the broadcast facility 150.

Figure 3B:
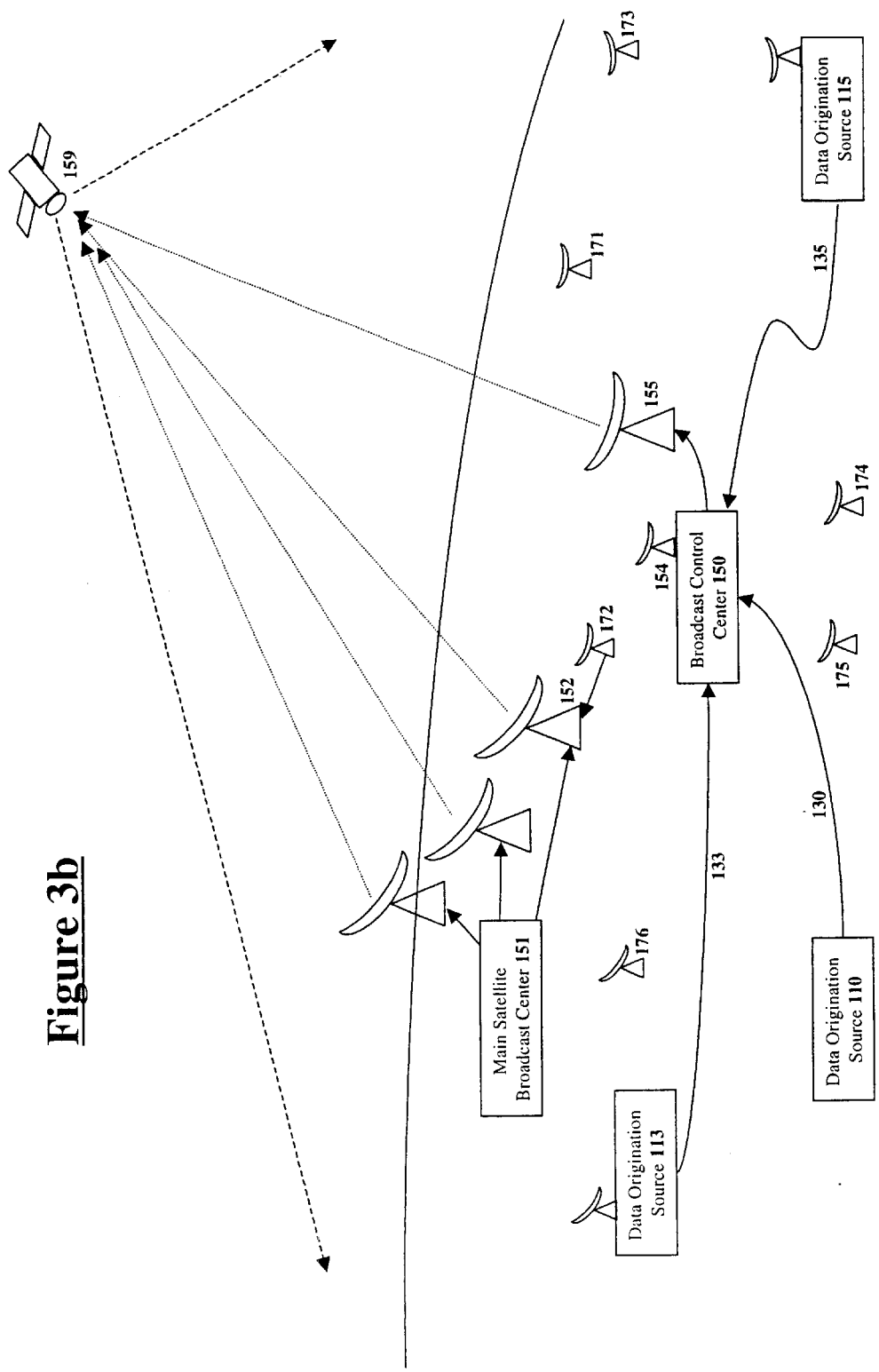
FIG. 3b illustrates a second satellite arrangement for data broadcasting wherein a satellite transponder is shared.

FIG. 3b illustrates a second method of broadcasting a digital information stream using a satellite transponder that is shared with one or more other broadcasters. In the broadcast arrangement of FIG. 3b, each broadcaster that shares a satellite transponder is assigned a specific frequency range to use. Each broadcaster transmits a signal to the satellite within its assigned frequency range.

To prevent the different broadcasters from disrupting each other's signals, each broadcaster must carefully limit the power of the signal that is transmitted to the satellite. To accomplish this goal, each satellite uplink facility monitors a reference signal that is broadcast from the satellite. The reference signal is used to determine the current radio propagation characteristics of the atmosphere. By measuring strength of the reference signal, each broadcaster determines how much power is needed when transmitting to the satellite.

In FIG. 3b, receiver system 172 monitor s the received signal and adjusts the power output of transmitter 152 and receiver system 154 at the broadcast center 150 monitors the received signal and adjusts the power output of transmitter 155. Thus, using the configuration of FIG. 3b, the broadcast facility 150 receives carefully monitors and uses own dedicated frequency allotment from a satellite transponder without having to use the entire frequency spectrum available on the satellite transponder.

Figure 3C:
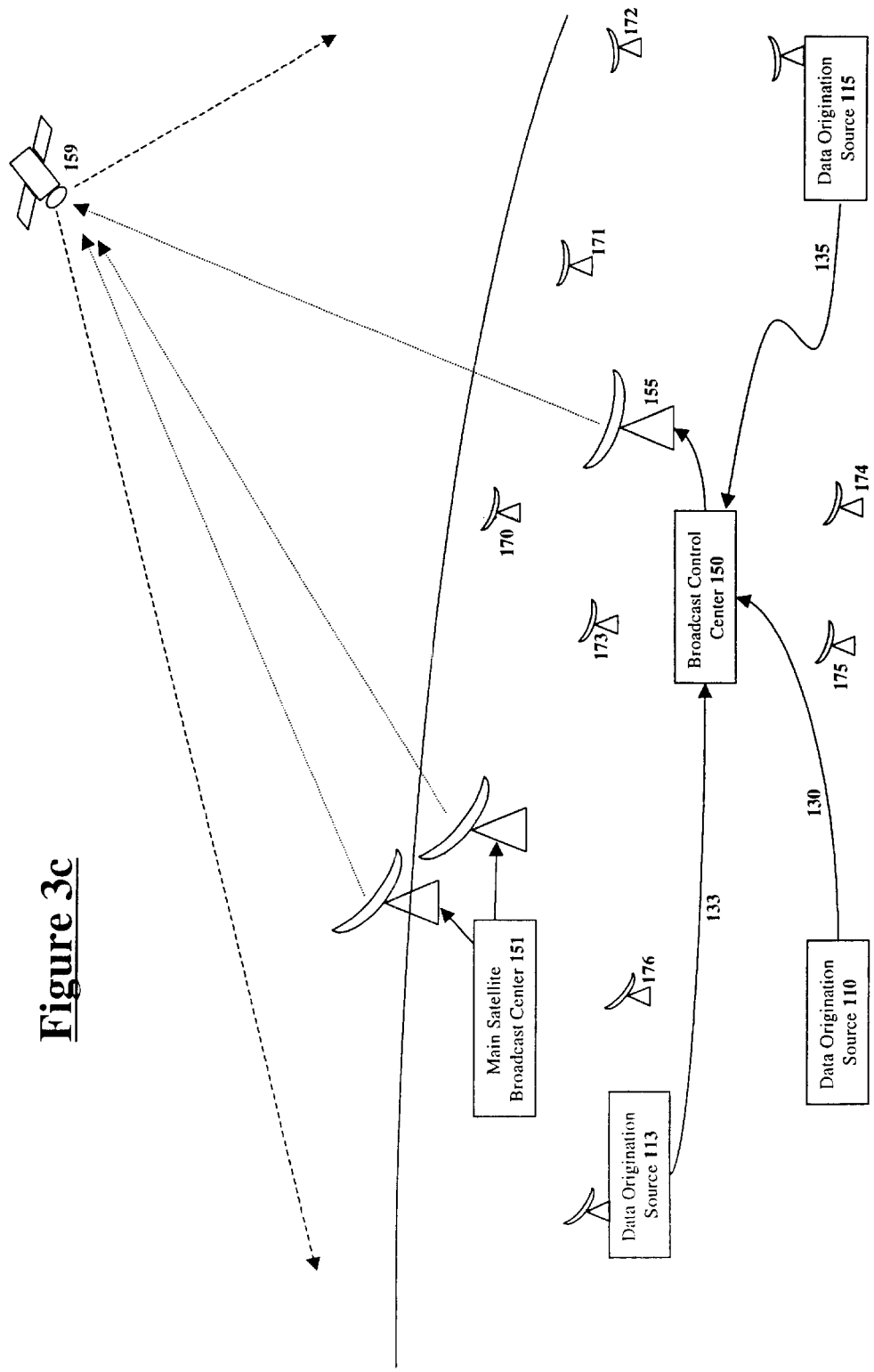
FIG. 3c illustrates a third satellite arrangement for data broadcasting wherein a full satellite transponder is used for data broadcasting.

FIG. 3c illustrates a third method of broadcasting information using a full satellite transponder for data broadcasting. In the arrangement of FIG. 3c, the broadcasting facility uses the entire bandwidth of a satellite transponder for data transmission. In such a situation, the uplink facility modulates the information and transmits the information up to the satellite. By using a full satellite transponder, digital broadcast speeds of many Megabytes per second can be achieved.

Figure 3D:
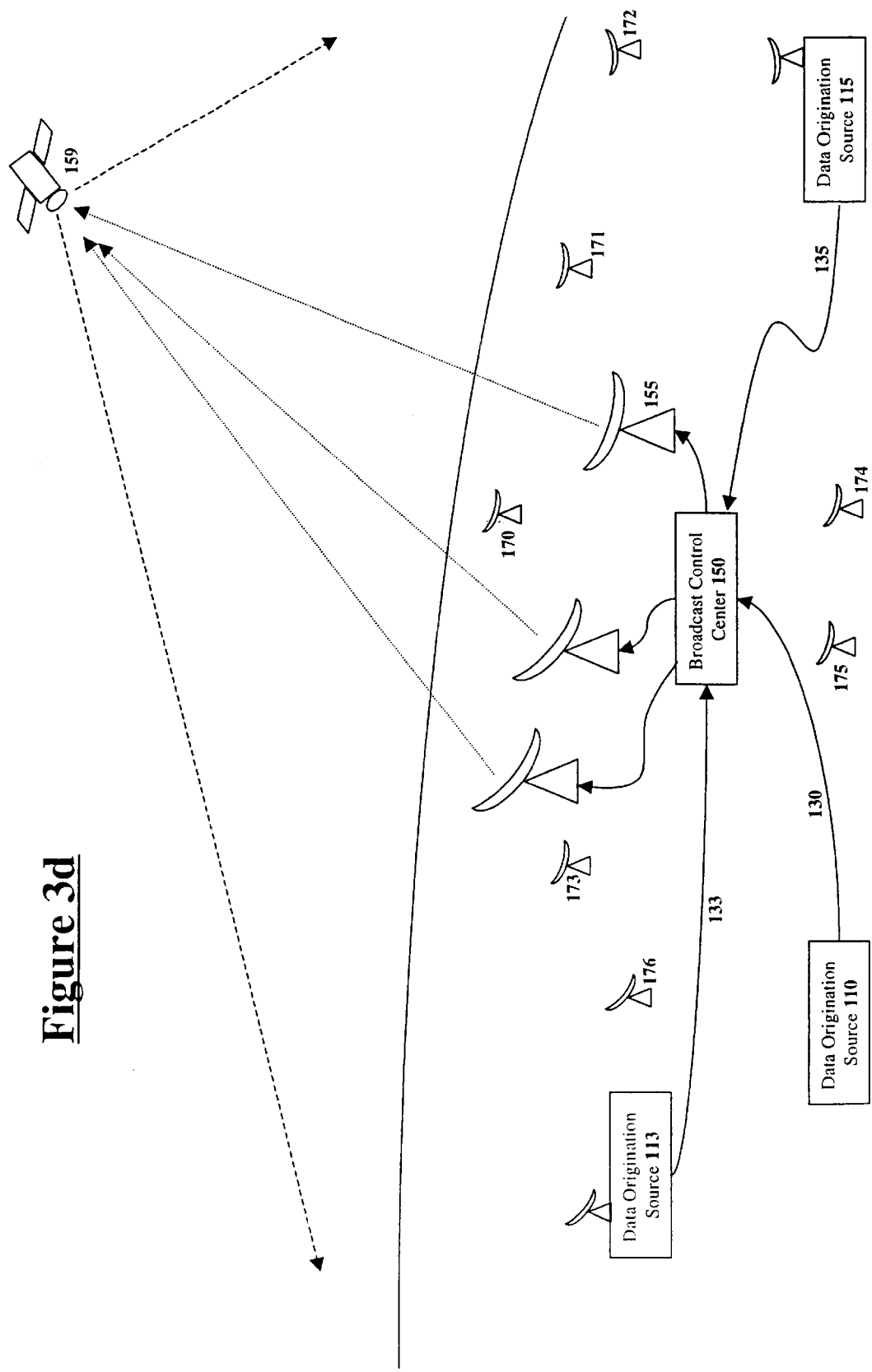
FIG. 3d illustrates a third satellite arrangement for data broadcasting wherein multiple satellite transponders are used for data broadcasting.

FIG. 3d illustrates a fourth method of broadcasting digital information using a satellite system for data broadcasting. In the system of FIG. 3d, multiple satellite transponders are used to transmit a digital broadcast signal. In such an embodiment, the receiver systems may use multiple receiver circuits to monitor all the digital information streams being broadcast.

Terrestrial Broadcast Distribution

Figure 4:
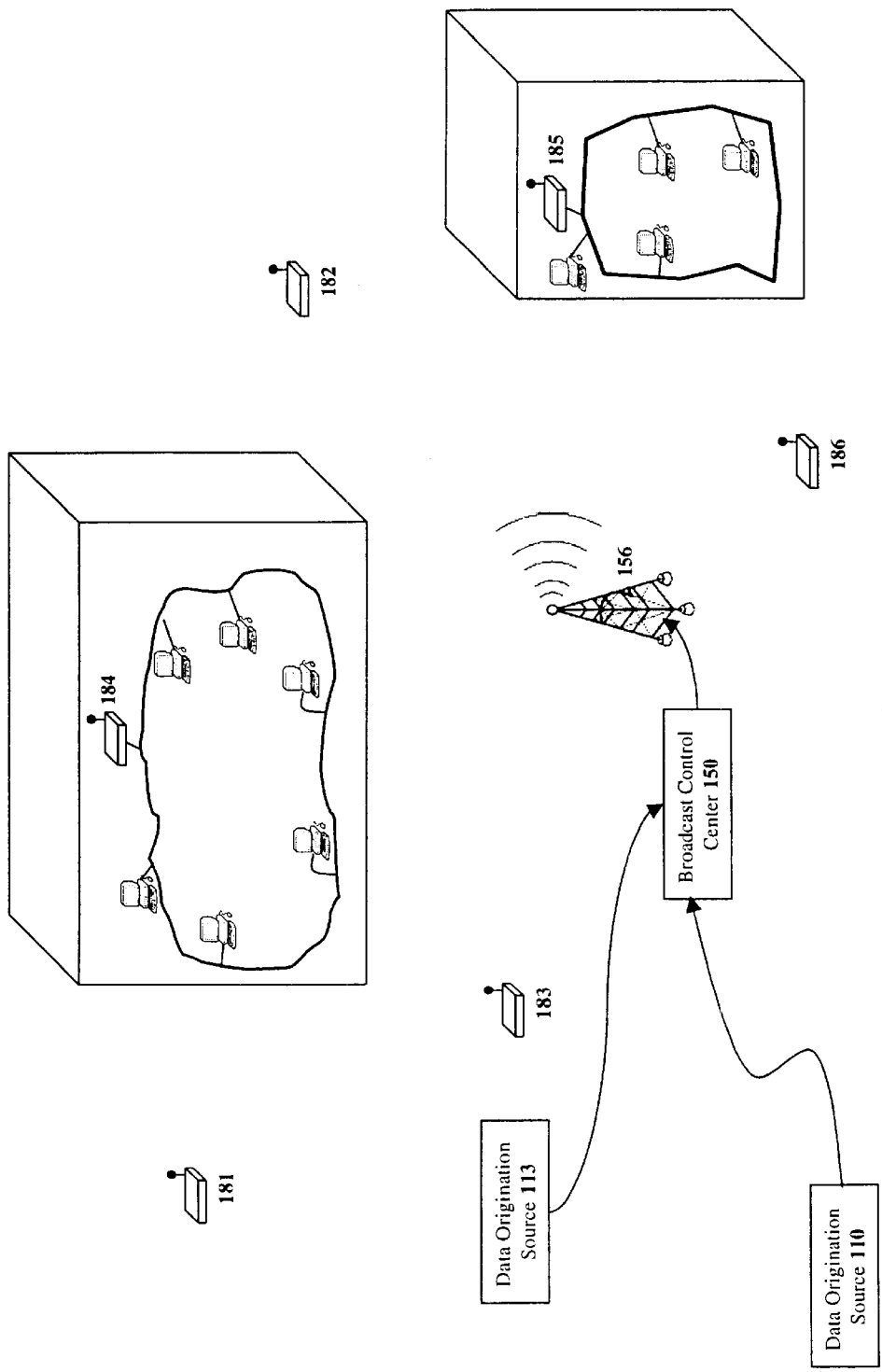
FIG. 4 illustrates an embodiment of a terrestrial data broadcasting arrangement.

FIG. 4 illustrates a first embodiment for broadcasting information on a terrestrial broadcast system using the teachings of the present invention. In the embodiment of FIG. 4, the terrestrial broadcasting facility is a High Definition Television (HDTV) transmission facility. However, other terrestrial radio frequency transmission systems may be used.

In a terrestrial HDTV based transmission system, the processed multiplexed information stream is broadcast on the HDTV transmission system using the MPEG-2 transport protocol. A terrestrial HDTV based transmission system has an advantage over DVB satellite systems in that no directional satellite antenna system needs to be installed. Instead, a terrestrial HDTV based transmission system can use existing television antennas.

Figure 5A:
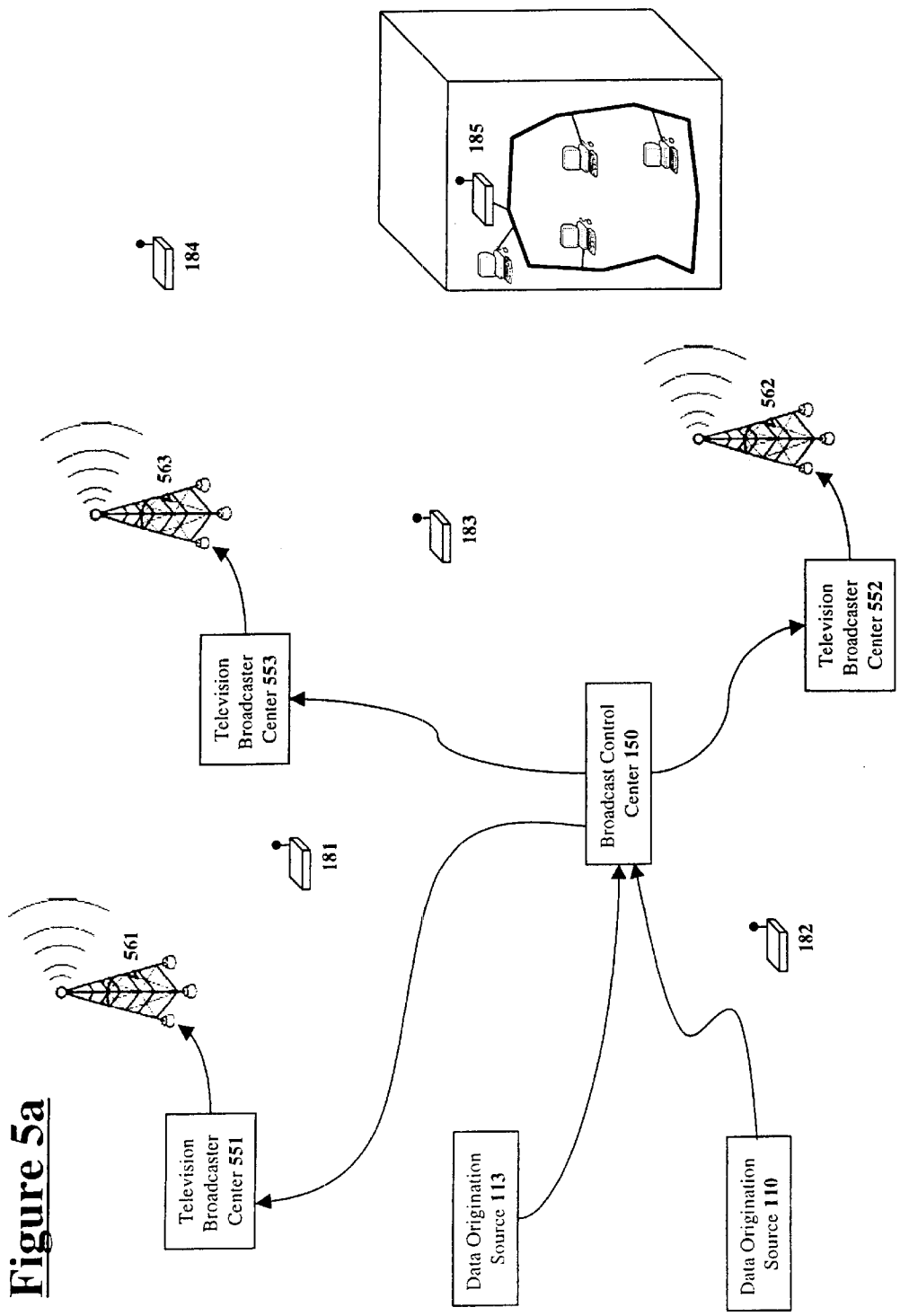
FIG. 5a illustrates an embodiment of a terrestrial data broadcasting arrangement that uses extra bandwidth on multiple HDTV broadcasters.

The cost of building and maintaining a terrestrial HDTV transmission system is very high. It would therefore be desirable to optimally use all the functionality provided by a terrestrial HDTV transmission system. To fully use all the available bandwidth of a terrestrial HDTV transmission system, the present invention introduces an embodiment that uses extra capacity on terrestrial HDTV transmission systems. Specifically, FIG. 5a illustrates an alternate embodiment wherein the broadcast control center 150 delivers MPEG-2 transport protocol encoded information streams to one or more terrestrial HDTV television broadcast centers (551, 552, and 553). The terrestrial HDTV television broadcast centers (551, 552, and 553) merge the received MPEG-2 transport protocol encoded information streams into their ATSC (Advanced Television Standards Committee) digital television signals and broadcast the signal to all the receiver systems. The receiver systems (181, 182, 183 . . . ) receive the ATSC digital television signals and extract the desired digital information streams from the broadcast control center 150. In such an embodiment, the receiver systems (181, 182, 183 . . . ) should have more than one receiver circuit such that multiple HDTV television broadcast centers (551, 552, and 553) can be monitored simultaneously.

Figure 5B:
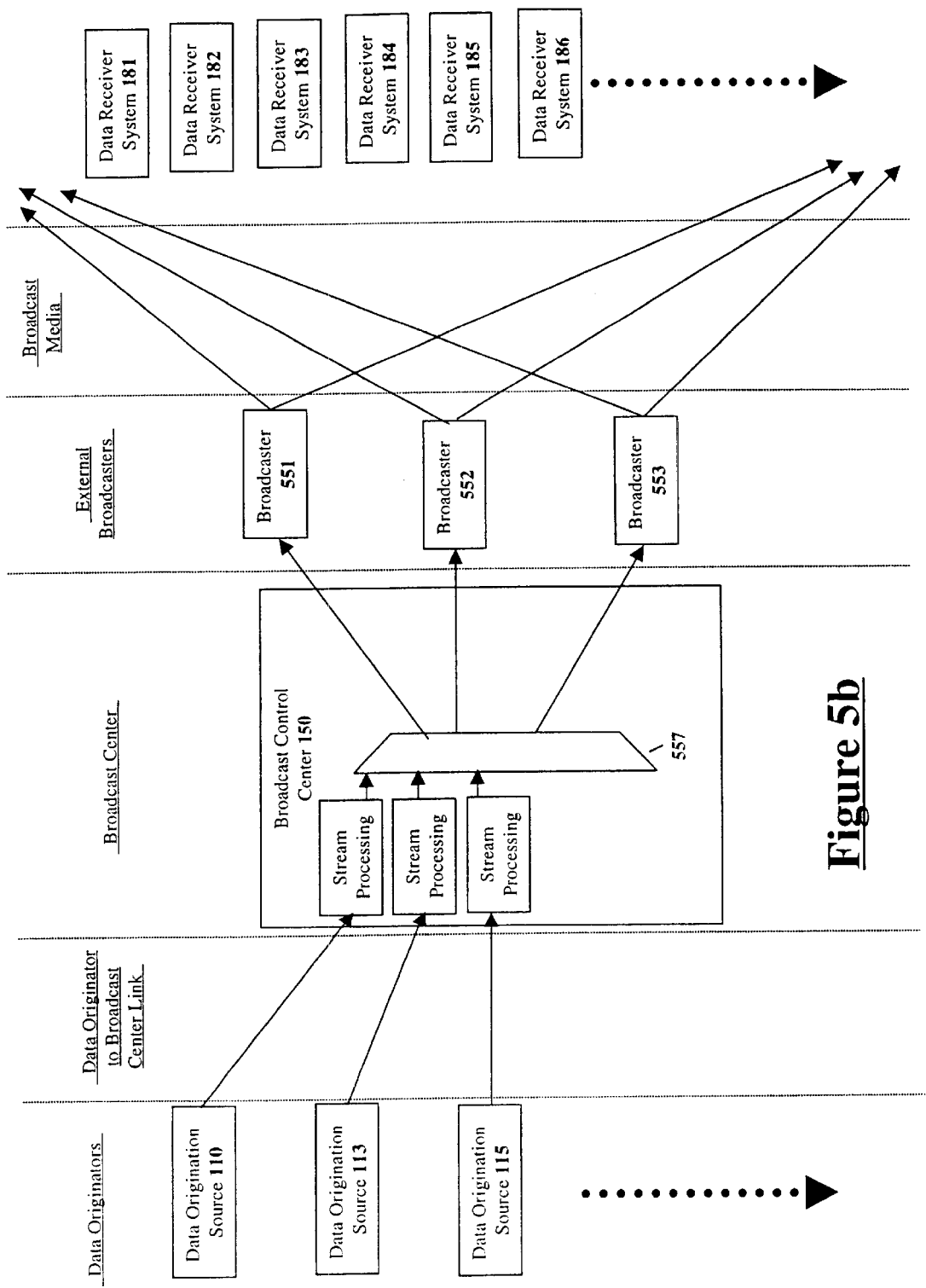
FIG. 5b illustrates a block diagram of an embodiment of a terrestrial data broadcasting arrangement that uses extra bandwidth on multiple HDTV broadcasters.

FIG. 5b illustrates a block diagram of the embodiment in FIG. 5a. As illustrated in the block diagram of FIG. 5b, the multiplexing unit 557 has a different set of parameters than the previously disclosed multiplexing unit 157. Specifically, the multiplexing unit 557 in FIG. 5b must multiplex all in processed incoming digital information streams into a number of outgoing digital information streams equal to the number of broadcast stations being used. For example, in the example embodiment of FIGS. 5a and 5b, the multiplexing unit 557 must distribute the outgoing digital information stream to the three television broadcaster stations (551, 552, and 553). All of the receiver systems (181, 182, 183 . . . ) will receive the broadcast signals from all the participating television broadcaster stations (551, 552, and 553).

The individual digital television broadcast stations 551, 552, and 553 multiplex the data broadcast information in with their local digital television signal. The individual digital television broadcast stations 551, 552, and 553 may also multiplex in additional locally generated data broadcast content. For example, digital television broadcast stations 551 may create additional data broadcast formatted content with local advertisers and local news teams. These local content digital information streams provide additional data broadcast content to the data broadcast digital information streams. All of the receiver systems (181, 182, 183 . . . ) will receive the data broadcast signals from all the participating television broadcaster stations (551, 552, and 553).

Terrestrial television broadcasting is region based broadcast system wherein only the signals from local broadcasters can be received. The United States is divided into many terrestrial television broadcast regions or "markets." To broadcast the same program throughout the entire United States, many television stations are aligned into television "networks" wherein a single set of programming is distributed to the network affiliates in each market. ABC, CBS, and NBC are the most well known television networks in the United States. The system of the present invention can use the same model for distributing digital information streams nationwide.

Networked Terrestrial Broadcast Distribution

Figure 6:
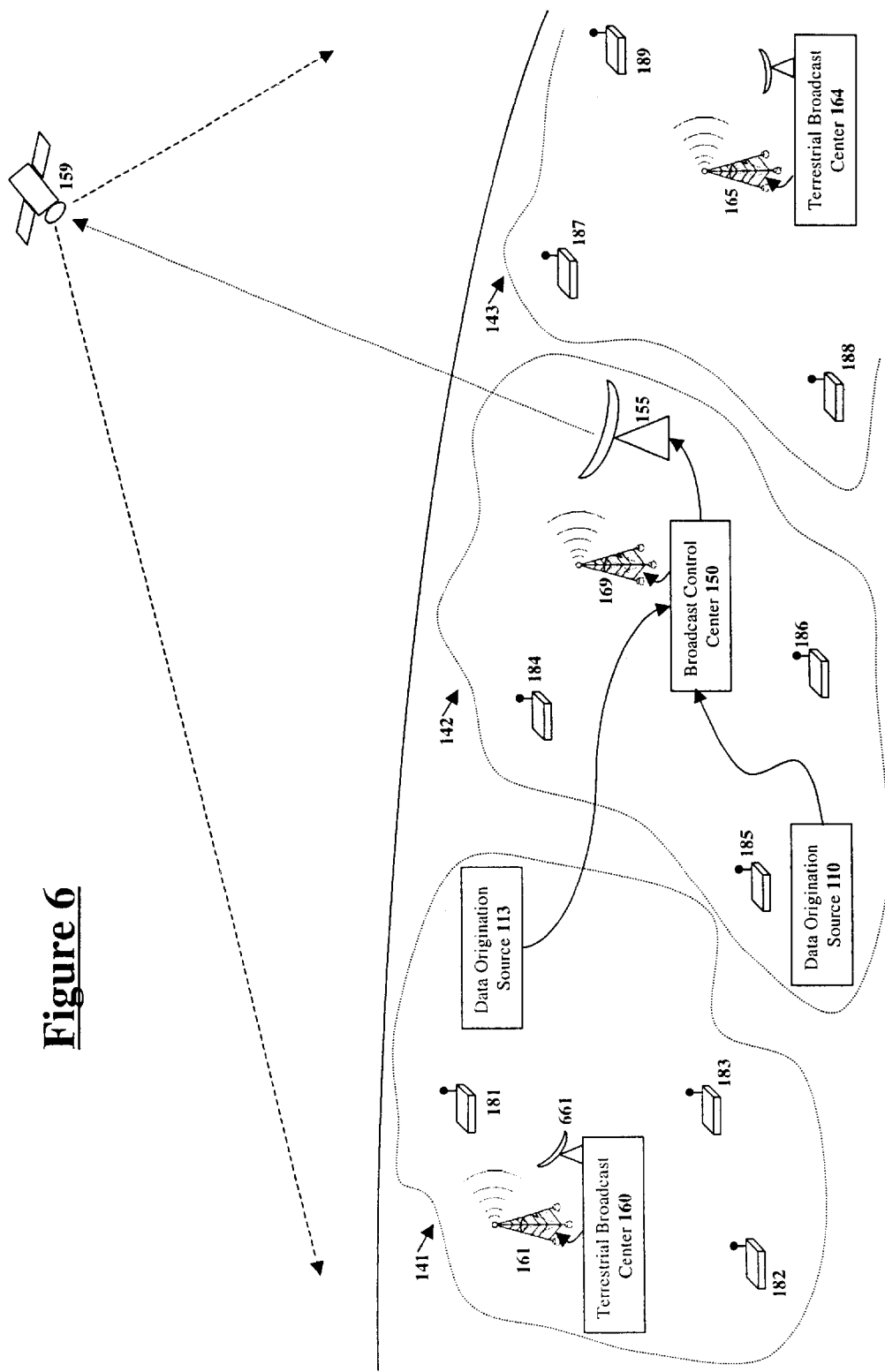
FIG. 6 illustrates an embodiment wherein a satellite broadcast system is used to deliver data broadcast signals to a number of regional terrestrial data broadcasting sites.

FIG. 6 illustrates one embodiment of a multi-region terrestrial digital broadcast system. In the system of FIG. 6, the broadcast control center 150 receives digital information streams from a plurality of different data origination sources (110 and 113). The broadcast control center 150 then creates the digital broadcast signal and transmits the signal via satellite 159 to a number of terrestrial broadcast centers (160 and 164) in different regions (141, 142, 143 . . . ). In the embodiment of FIG. 6, the local terrestrial broadcasters receive the digital broadcast signal from the satellite 159 and rebroadcast that signal to the receivers in the local broadcast region. As previously set forth with the reference to FIGS. 5a and 5b, each local terrestrial broadcaster (150, 160, and 164) may add locally generated data broadcast content to the data broadcast signal before transmission.

For example, terrestrial broadcast center 160 in region 141 receives the signal from satellite 159 through satellite dish antenna 661. Terrestrial broadcast center 160 then rebroadcasts the signal through the terrestrial broadcast antenna 161. Similarly, terrestrial broadcast center 164 receives the data broadcast signal from the satellite and rebroadcasts the signal in region 143 using terrestrial broadcast antenna 165.

In a networked terrestrial broadcast system as illustrated in FIG. 6, the data origination sources may be given the option of specifying which terrestrial regions to broadcast within. Thus, if an entity does not have receivers in a particular terrestrial broadcast region, then the terrestrial broadcaster within that region will not broadcast data streams from that entity.

The Receiver Units

Each receiver unit includes the necessary circuitry to receive the digital broadcast signal (or signals) and extract the desired digital information streams from the digital broadcast signal. Specifically, each receiver system includes an antenna and receiver circuitry, such as radio frequency receiver circuitry, for demodulating the digital broadcast signal. Furthermore, each receiver system includes digital processing circuitry for decoding and decrypting the digital information streams within the demodulated digital broadcast signal. The digital processing circuitry further selects desired digital information streams using address information in the digital information streams and an address of the particular receiver.

For example, in the direct video broadcast satellite based data broadcasting embodiments of FIGS. 1 and 3a to 3d, each receiver system includes a satellite dish antenna and related satellite receiver circuitry. The satellite dish antenna receives the data broadcast signal and the satellite receiver circuitry demodulates the digital broadcast signal to retrieve the digital information stream. Note that other embodiments will use other appropriate receiver circuitry depending on the broadcast medium. The receiver will also include digital processing circuitry for decoding and decrypting the received digital information stream. In most embodiments, the digital processing circuitry for decoding and decrypting can be the same for different broadcast media.

Figure 7:
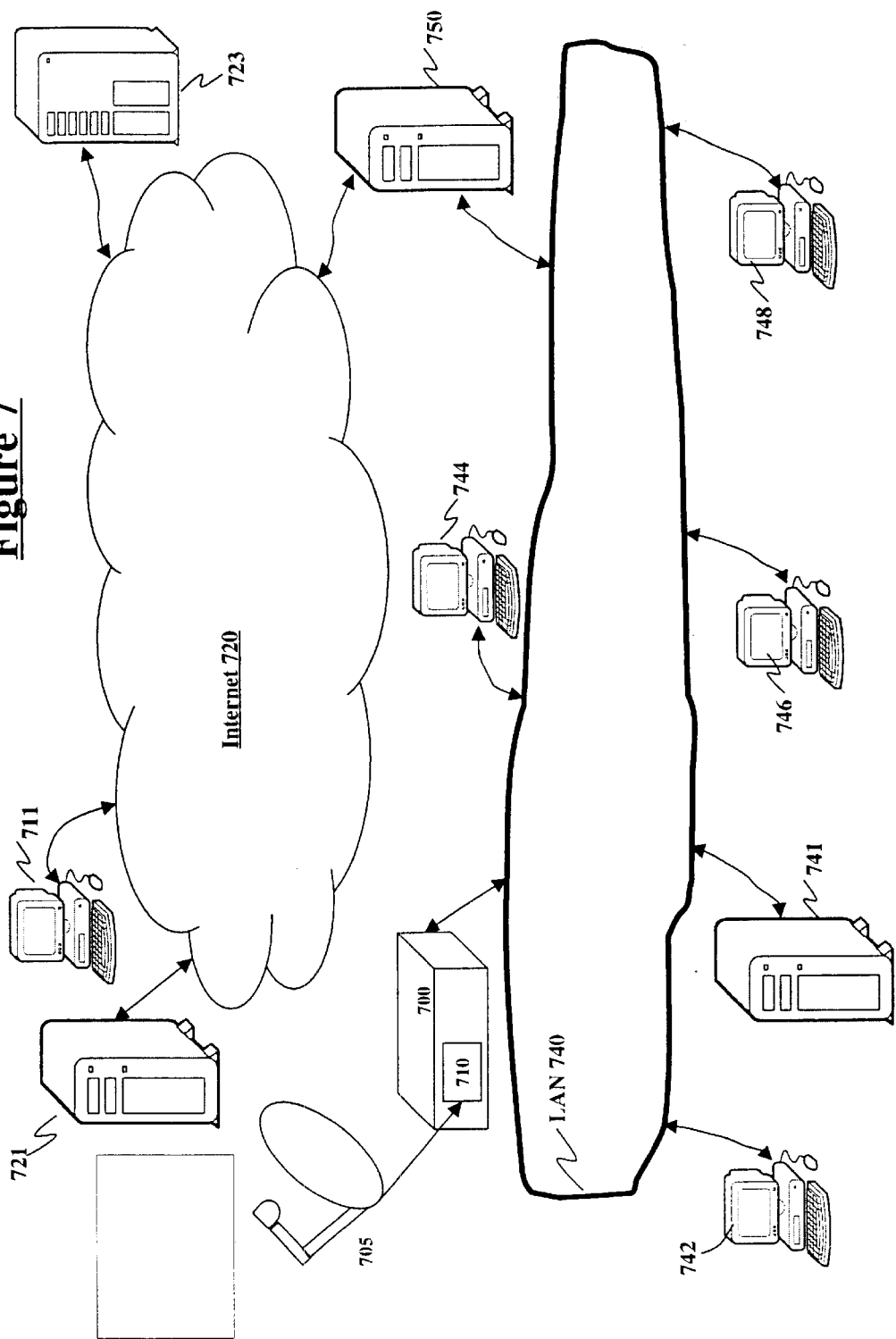
FIG. 7 illustrates a diagram of one embodiment of a receiver system used within a LAN environment.
Figure 8:
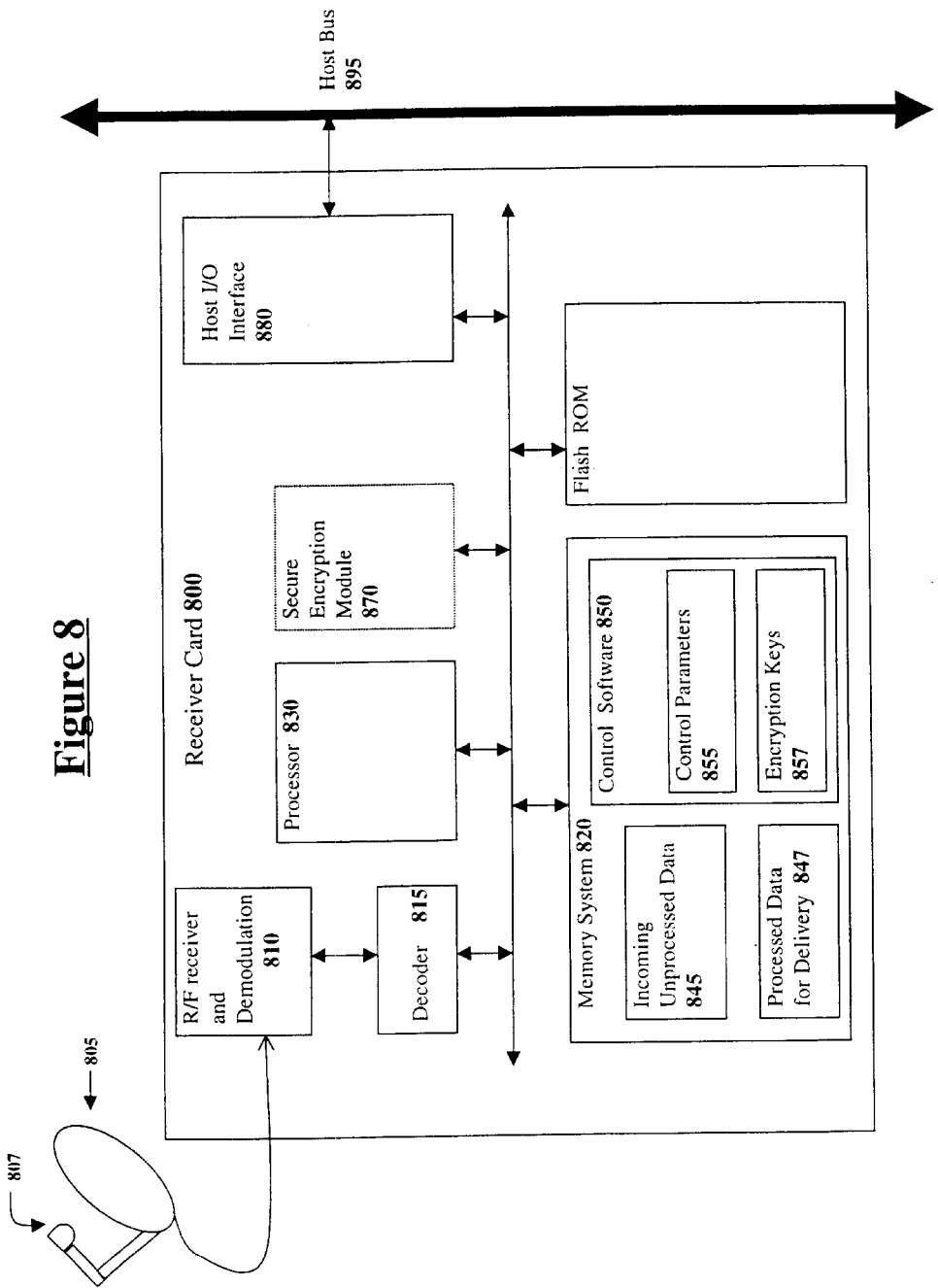
FIG. 8 illustrates a block diagram of one possible embodiment of a receiver system built according to the teachings of the present invention.

FIGS. 7 and 8 illustrate a block diagram of one embodiment of a receiver built according to the teachings of the present invention. Particular implementation details of the one embodiment will be disclosed with reference to FIGS. 7 and 8. However, the embodiment of FIGS. 7 and 8 is only meant to illustrate one possible implementation of a directed broadcast receiver system.

FIG. 7 illustrates one embodiment of a receiver system used in a LAN environment. In the embodiment of FIG. 7, an antenna 705 is coupled to a receiver card 710 in a host computer system 700. The host computer system 700 is further coupled to a Local Area Network (LAN) 720. The antenna 705 receives broadcast signals from the broadcast facility. In the embodiment of FIG. 7, the antenna system is a satellite antenna system. However, other broadcast media will require other types of antenna systems.

The receiver card 710 coupled to the antenna 705 demodulates, decodes, decrypts, and decapsulates the broadcast data signal to retrieve the digital information streams. In the preferred embodiment, Internet Protocol packets are decapsulated from MPEG-2 transport frames. The receiver card 710 passes the decrypted packets to the host computer system 700. The host computer system 700 passes the packets to applications running on the host system or broadcasts the packets on the LAN 740 as necessary.

FIG. 8 discloses one embodiment of the receiver card 710 in greater detail. The receiver card 800 in FIG. 8 will be described with reference to FIG. 9 that describes the flow of data through the receiver card. Specifically, FIG. 9 will describe how data packets are received, processed, and then output by the receiver card of FIG. 8 and an accompanying host computer system as illustrated in FIG. 7.

The receiver embodiment of FIG. 8 comprises a receiver antenna, a receiver card 800, and a host computer system (not fully shown). As set forth with reference to FIG. 7, the receiver card 800 outputs a stream of processed packets to a host computer system across a host computer bus 895.

Referring to FIG. 8, a receiver system includes a dish antenna 805 receiving microwave frequency satellite signals broadcast from a DBS satellite. The dish antenna reflects the microwave signals onto a Low Noise Block-converter (LNB) 807. The Low Noise Block-converter (LNB) 807 receives the satellite microwave signals to and coverts the satellite microwave signals to a lower frequency range.

The satellite signals that have been block-converted by the LNB 807 are then demodulated by radio frequency (RF) receiver and demodulation circuitry 810. In a Ku Band satellite receiver system, the receiver circuitry filters and amplifies the frequency range of the desired signal. The RF receiver circuitry then multiplies the desired signal by a local oscillator to recover an in-phase (I) and quadrature (Q) version of the transmitted signal. The receiver circuitry passes the in-phase (I) and quadrature (Q) signals to an analog to digital (A/D) converter. The analog to digital (A/D) converter digitizes the in-phase (I) and quadrature (Q) signals. The RF receiver and demodulation circuitry 810 output a tuned and filtered DVB-S signal. This step is listed as the starting point 900 on the flow diagram illustrated in FIG. 9.

Figure 9:
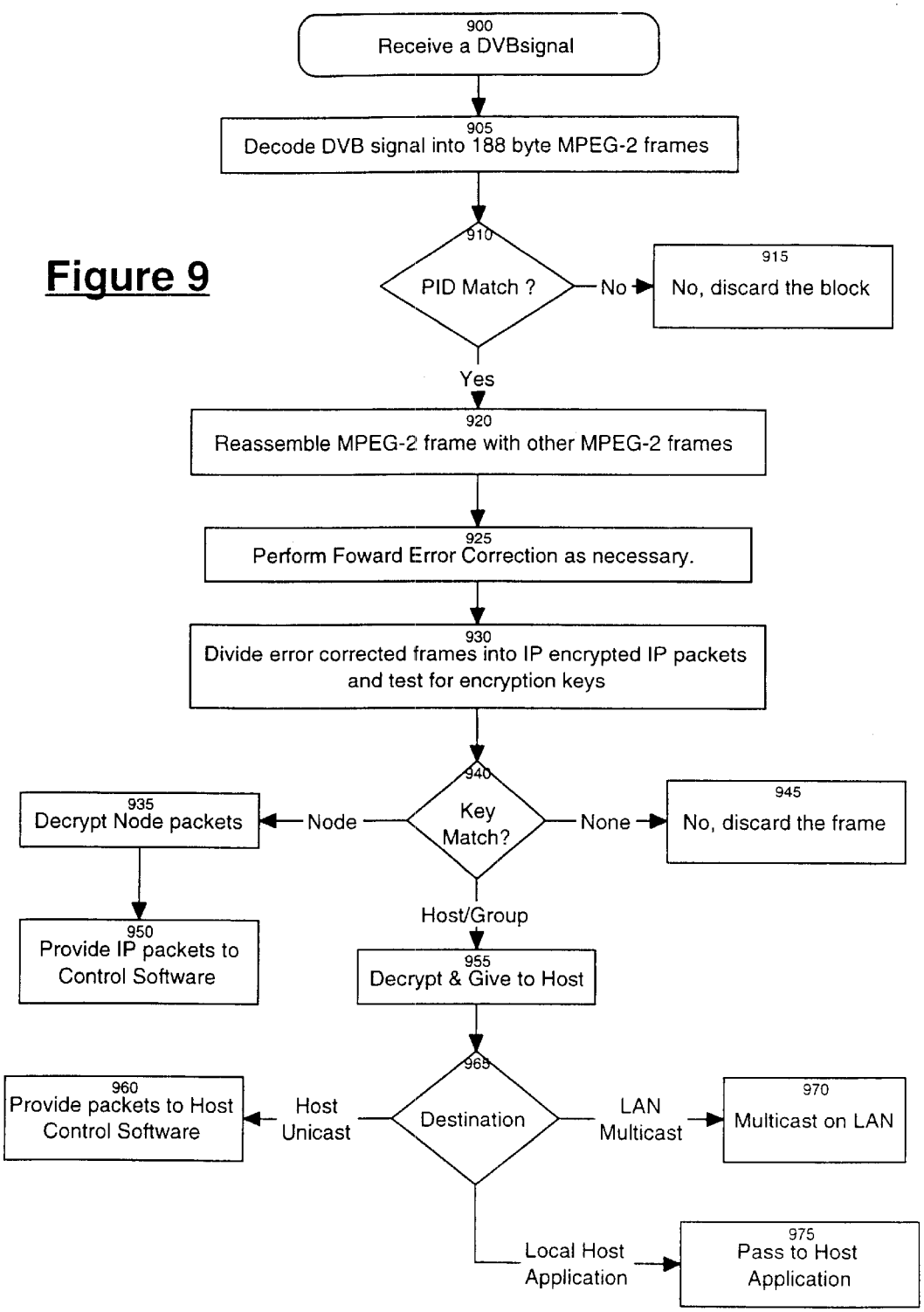
FIG. 9 illustrates a flow diagram that describes how the receiver system may process the incoming broadcast information stream.

The direct video broadcast signal must then be demodulated and decoded as stated in step 905 of FIG. 9. The DVB demodulation and decoding is performed by the decoder unit 815 in FIG. 8. In the receiver embodiment designed to operate in the DVB satellite system illustrated in FIG. 8, the decoder unit 815 decodes the digitized in-phase (I) and quadrature (Q) signals and outputs a stream of direct video broadcast (DVB-S) frames. The output DVB frames comprise an MPEG-2 transport stream block. In one embodiment, the decoder unit 815 comprises an OTI-8511P QPSK demodulator integrated circuit from Oak Technology of Sunnyvale, Calif. The MPEG-2 transport stream is defined by the ISO standard defined in the document ISO/IEC 13818-1 titled "Information technology—Generic coding of moving pictures and associated audio information: Systems."

In one embodiment, the decoder unit 815 places the decoded data MPEG-2 transport stream into a memory system 820 on the receiver card 800. After the MPEG-2 transport stream has been placed into the memory system 820, the remaining processing steps of FIG. 9 will be performed by a general purpose processor 830 on the receiver card 800 and the host computer system in the embodiment of FIG. 8. Specifically, a control program 850 in the memory system of the receiver card 800 is executed by the processor 830 to process incoming unprocessed data 845 into processed data 847 awaiting delivery.

The control program 850 operates using a set of control parameters 853 such as IP addresses, program identifiers, frequency ranges, etc. The control program 850 also uses a set of encryption keys 857 for decrypting information addressed to this particular receiver or a group to which this receiver system belongs.

In one embodiment, the control program may use a secure encryption module 870 for generating secure keys. The secure encryption module 870 holds certain encryption keys in a tamper-proof electronic module such that any attempt to access the keys will destroy the secure encryption module 870 along with the enclosed encryption keys. In one embodiment, the secure encryption module 870 comprises an iButton from Dallas Semiconductor of Dallas, Tex.

The digital information stream output by the decoder unit 815 consists of all the entire digital information stream that is being broadcast by the data broadcast station. However, each individual receiver unit is usually only interested in small amount of the information being broadcast. To limit the amount of data that needs to be processed, the receiver in the embodiment of FIG. 8 examines the program ID field (PID) of each MPEG-2 frame as stated in step 910 of FIG. 9. Specifically, the receiver system determines if the receiver system may be interested in the packet by examining the program ID field that identifies the MPEG-2 frame. If the receiver system determines that the MPEG-2 frame does not have any information that can be used by the receiver system, then the receiver system simply discards the MPEG-2 frame as stated in step 915 of FIG. 9. Thus, no more processing will be performed on MPEG-2 frame having program IDs that receiver does not "listen" to.

When the program ID specifies that the MPEG-2 frame may contain useful information, the control program then reassembles the relevant MPEG-2 frames at step 920. The MPEG-2 frame reassemble places the frames into a defined order such that a forward error correcting code may be used to check for errors and correct detected errors. Thus, at step 925, the control program performs error correction on the reassembled MPEG-2 data frames. The error correction is in addition to the error correction that already exists for MPEG-2 transport streams since the present invention may be used to carry important data that must not be lost or altered. As previously set forth, the forward error correction encoding may be done on a stream by stream basis such that different digital information streams may use different encoding parameters. The different encoding systems may be used to provide quality of service levels.

The error correction process produces an encrypted data stream as an output. In one embodiment, the error correction process produces a stream of encrypted Internet Protocol (IP) packets. At step 930, the stream of encrypted data is divided into the individual encrypted IP data packets. Furthermore, the addressing and/or encryption of the IP packets are examined at steps 930 and 940 to determine if this particular receiver system may decode and use the data. If the receiver system does not have the proper encryption keys or the packet is not addressed to this receiver system, then the receiver system discards the packet as stated in step 945.

However, if a packet is addressed to this particular receiver card (or node) or a group to which the receiver system belongs, then the packet is decrypted at step 935 and passed to the control software at step 950. The control software will use the data packet as necessary. Data packets may be addressed to receiver card control software for a number of reasons including receiver card software updates, encryption key distribution, and control parameter modification.

If a data packet is addressed to the host to a group to which the host belongs, then the control software proceeds to step 955 where the packet is decrypted and passed to the host computer system 700. Referring back to FIG. 8, the control software passes the packet to the host computer system using I/O interface 880 to pass the packet across the host computer bus 895.

Once a packet has been passed to the host computer system (not fully shown), the host computer system is then responsible for the remainder of the packet processing. Referring back to FIG. 9, the host computer system examines the address of the packets that are received at step 965. If a data packet is addressed to the host computer system, then the packet is passed to the host control software as stated in step 960. Packets addressed to the host control software may be used to update the host control software or adjust host control software parameters.

Multicast IP packets may be handled in at least two different manners. A first type of multicast packet is a multicast packet that is meant to be put onto the local LAN if there are any interested local client systems that have subscribed to the particular multicast stream. For example, if a streaming video broadcast of a distance learning lecture is received by the receiver unit and there is an interested client coupled to the LAN, then the receiver unit will place the multicast packet onto the LAN coupled to the receiver unit as stated in step 970. Thus, the receiver acts like a multicasting router that delivers a multicast stream as necessary.

Other multicast packets are simply delivered to local applications on the receiver unit as stated in step 975. For example, one application for the directed broadcast system of the present invention is remote database or cache duplication. In such an application, the goal is to duplicate the contents of one database or cache at one or more remote locations. The system of the present invention can be used to perform such a task by having an application program on the host computer system that monitors a multicast stream that multicasts any changes to the database or cache. When a modification to the database or cache is multicast, the application performs the same change on a local copy of the database or cache. The duplicated database or cache can be made available to other applications coupled to the local LAN using server software.

A Host System Embodiment

Figure 10:
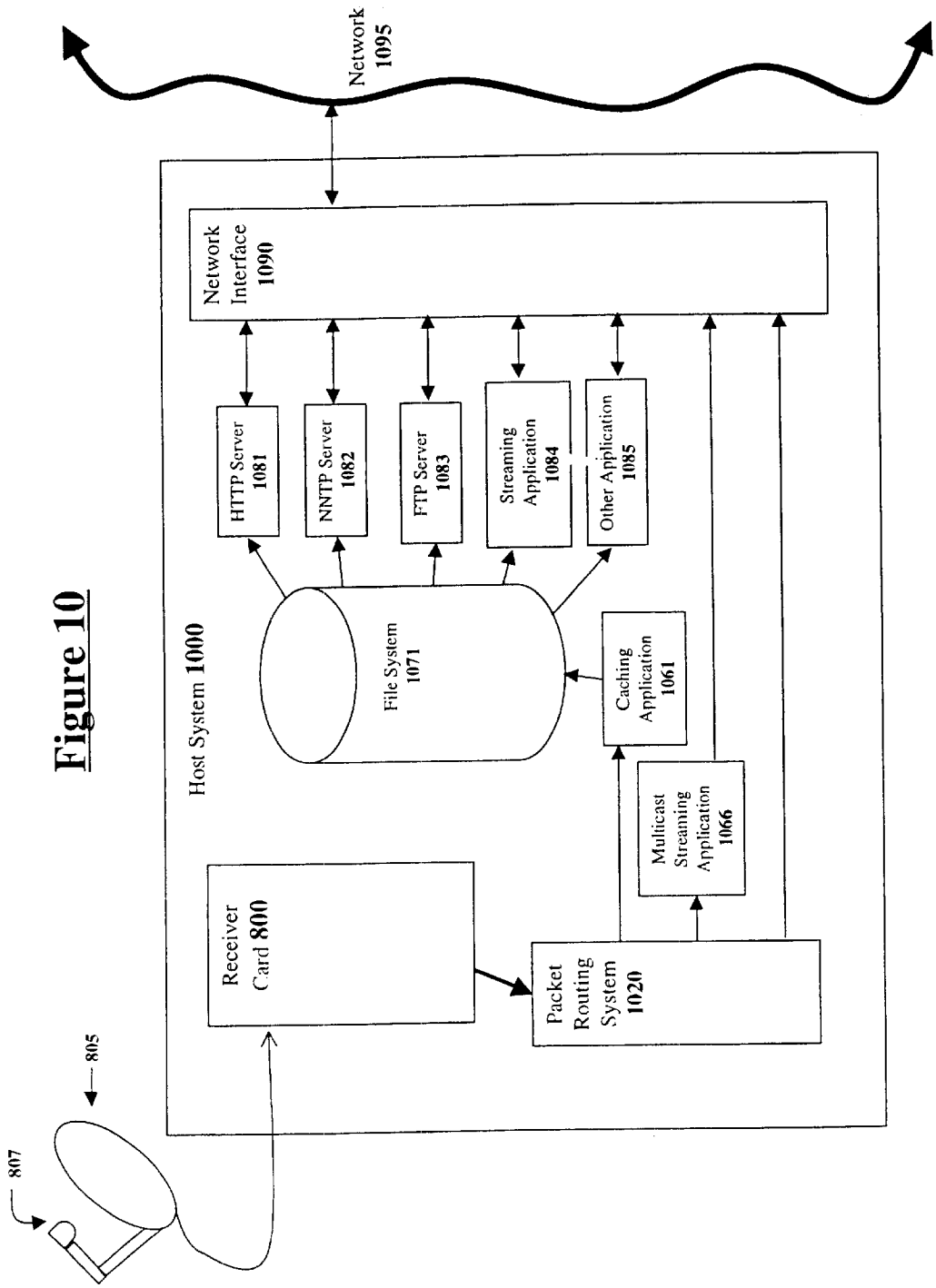
FIG. 10 illustrates a block diagram of one embodiment of a host system that consumes and distributes data from the data broadcasting system.

FIG. 10 illustrates a block diagram of one possible host system 1000 embodiment. In the embodiment of FIG. 10, the receiver card 800 receives, demodulates, and decodes the digital broadcast signal. The receiver card 800 then passes decapsulated IP packets from the information streams that the host system 1000 is interested in to a packet routing system 1020.

The packet routing system 1020 routes the IP packets appropriately as specified by the packet's destination IP address. Some packets may be routed out onto the local area network 1095 through a network interface 1090 on the host system 1000. Some packets may be routed to applications running on the host system such as multicast streaming application 1066 and caching application 1061. Such applications may provide services other systems using the received information.

A caching application 1061 can provide information for a number of other applications that use the received information indirectly. For example, the caching application 1061 may store received information on a local file system 1071. The caching application 1061 may include features for eventually removing outdated information using a timestamp system. Other applications on the host system 1000 can accessed the cached information to provide services to client systems located on the local area network 1095. For example, a world wide web server application (HTTP server) 1081 can access received web pages and serve those web pages to browser clients on the local area network 1095. The receiver card may receive a USENET (NNTP) news feed such that the USENET news is stored on the file system 1071. Local client systems could then access the USENET news information by accessing an NNTP server 1082 running on the host system 1000.

Applications for the Directed Broadcast System

The directed data broadcast system of the present invention can be used for a number of different applications. This document will describe several of the possible applications. However, these applications are for illustrative purposes only. There are many more applications that can be implemented with the teachings of the present invention.

Audio and Video Streaming

One of the current uses of the Internet multicast backbone (MBONE) is audio and video streaming. Video streaming consists of delivering compressed video across a digital connection in real-time. Similarly, audio streaming consists of deliver compressed audio across a digital connection in real-time. The quality of streamed audio and video varies greatly upon the bandwidth allocated for the streaming operation. For example, streaming video across a low bandwidth 28.8K modem connection requires extremely high compression that will greatly degrade picture quality, size, and frame rate. However, a one megabit per second bandwidth can carry compressed video of acceptable quality using the MPEG-1 video compression system or other known video compression systems.

The current Internet multicast backbone (MBONE) is used to carry streamed video. However, since the currently used implementation of the Internet Protocol (IP version 4) does not have any Quality of Service classes or guarantees nor any way of reserving bandwidth, video streamed across the Internet is subject to packet delays and packet loss that will break up the streamed video.

The directed data broadcast system of the present invention is ideal for video and audio streaming. First of all, the bandwidth of the present invention can be scaled according the bandwidth that is needed for the quality of streaming that is required. The system of the present invention can be scaled from low bandwidth telephone-quality audio streaming up to full high-definition television (HDTV) video streaming. Furthermore, the private broadcast system of the present invention allows information broadcasters to specify particular quality of service levels. Thus, guaranteed low packet throughput can be reserved for broadcasting streaming video of an important event.

Referring to step 970 of FIG. 9, streaming video would normally be considered a LAN multicast service wherein the multicast stream would be broadcast on the LAN that is coupled to the receiver unit. However, streaming video could simultaneously be provided a local host application as specified in step 975 since a local host application could capture the streamed video into a compressed video file on the host computer system. The file on the host computer system could then later be accessed for rebroadcast of the streamed video.

Audio and Video Conferencing

Figure 11:
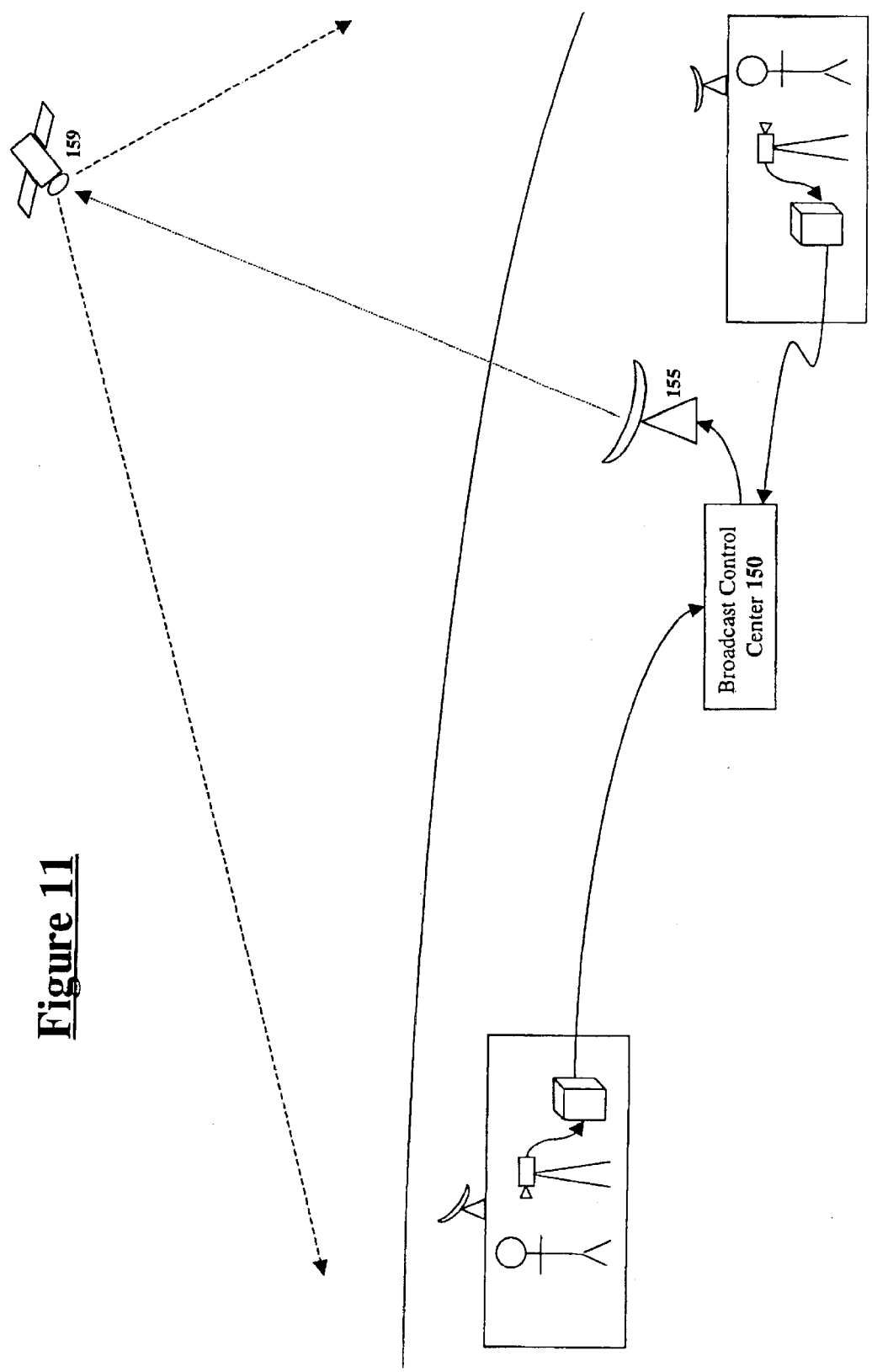
FIG. 11 illustrates a directed broadcast system being used for video conferencing.

The system of video and audio streaming described in the previous section can be expanded into audio and video conferencing systems provided that there is a communication channel back to the directed broadcast system. Specifically, FIG. 11 illustrate systems wherein multiple sites are coupled to the broadcast facility with communication links. Each site is capable of transmitting at least audio information or both audio and video information back to the broadcast facility across the communication links.

To create an audio or videoconference, one of the conference participants begins transmitting audio or both audio and video to the directed broadcast facility. The audio/video is then broadcast by the broadcast facility. Other conference participants can begin receiving the transmitted audio/video. To join the conference, the other conference participants begin transmitting their own audio/video to the broadcast facility such that the first participant and other participants may begin receiving their contributions.

The audio and/or video from the various conference participants can be mixed at different locations depending on the particular embodiment. In one embodiment, all the audio transmission streams from all the participants are mixed at the broadcast facility such that only a single audio track needs to be broadcast. In such an embodiment, the receiver system may perform auto-correlation to perform echocancellation that will eliminate a conference participant from hearing an "echo" of the locally generated audio. Similarly, the video feeds may be combined at the broadcasting facility such that only one combined video feed needs to be transmitted by the directed broadcast system. In one embodiment, the broadcast facility will determine which conference participant is generating audio and broadcast only the video feed from that participant. Thus, the broadcast facility would perform an automatic video selection of the speaking conference participant.

In another embodiment, each individual participant's audio is broadcast such that each receiver must locally mix the audio. In such a system, each conference participant can selectively mute particular conference participants. Similarly, multiple video feeds may be transmitted by the broadcasting facility such that each recipient can determine which video streams to display.

Not all participants in a conference may transmit video. For example, a conference participant that is coupled to the broadcast facility with a low bandwidth link such a modem link across a telephone line will likely elect to only transmit audio. Such participants may be represented by a still image or a window.

It should be noted that the present invention is ideal for multi-party audio or videoconferences. The broadcast nature of the present invention allows an unlimited number of parties to join into a conference since each participant can access the audio and video streams transmitted by each other participant. Furthermore, any number of nonparticipating viewers may be able to view and listen to the conference since the conference is being broadcast. The recipients allowed to view and listen to the conference may be limited by using the encryption based access control system inherent in the directed broadcast system of the present invention.

Intranet Replication

To distribute information within a corporation, many companies are implementing "Intranets." An Intranet is an internal private network that uses standard Internet protocols such as TCP/IP. For example, many corporations have internal web servers that store large amounts of internal company information such as project schedules, project data, product pricing, customer lists, employee benefit package information, company by-laws, etc. Intranets provide benefits such as instant updating and reduced publication costs.

When a company establishes several geographically remote sites, it becomes difficult to maintain an Intranet. One method of maintaining an intranet for a large organization with geographically remote sites would be to link all the sites with secure high bandwidth lines such that every intranet request could be handled by a central server system located at the organization's headquarters. However, such a system would be very costly since secure high bandwidth connections are very expensive.

An alternative method of maintaining an Intranet for a large organization with geographically remote sites would be to create local replicas of a main server at each geographic site. The local replicas would contain copies of all the information available in the main central server. Thus, when a client at a geographically remote site makes an Intranet request, the request will be handled by a local replica of the main Intranet server. The directed broadcast system of the present invention is ideal for maintaining such a distributed replicated system.

To maintain replicas of a main server at several different geographically remote sites, all changes made to the main server could be broadcast on an "update channel" using the present invention. A receiver at each remote site would receive the broadcasts and maintain the local replica such that the local replica would exactly match the main server at the headquarters. In one embodiment, an application program on the receiver would monitor the update channel to determine what changes have been made to the main server. The application would then make the exact same changes on a local replica of the main server. Thus, geographically remote sites would have the same information accessible as the main headquarters.

DNS Caching

The current version of the Internet Protocol uses a four-byte address value to identify each computer system coupled to the Internet. To simplify the addressing of Internet nodes, the Domain Name Service (DNS) was created. The Domain Name Service is used to assign simple alphanumeric names to computer systems coupled to the Internet. When an internet user accesses an Internet server by its domain name, the user's computer system looks up the Internet Protocol address for that computer by accessing a DNS server. For example, when a user accesses a web server at site addressed by the name of "www.yahoo.com", the user's computer contacts a DNS server to obtain the Internet Protocol address of a computer identified with the name of "www.yahoo.com". The process is known as a "DNS look-up." The user's computer system then communicates directly with the web server using the Internet Protocol address.

Each time a user accesses a different Internet site by domain name, a DNS look-up must be performed. The DNS server is usually located at the computer user's ISP such that a round trip request and response must be performed for each Internet access. This DNS look-up adds a latency period to most Internet accesses. To eliminate this DNS look-up delay, the present invention can be used occasionally deliver a large DNS table to each receiver system. Thus, the local receiver system at each site can be used as a DNS server such that DNS look-ups are performed at the high speed of the local network.

Database Transfer

Some institutions work with large databases that are created at a single location, but distributed to several remote locations. For example, a nationwide retailer may maintain a national price database at a headquarter office. When a nationwide sale occurs, the nationwide retailer must then distribute the sale prices to all the retail outlets around the country. The directed broadcast system of the present invention could be used to distribute such a database.

The mechanics of a database transfer system would be essentially similar to the previously described intranet replication system. Specifically, an file copy application on the host computer system would monitor for digital information streams containing files addressed to the host computer system or a group to which the host computer system belongs. When a digital information stream containing a file is detected, the file copy application would create a copy of the file from the streamed digital information. Thus, the directed broadcast database distribution application would be similar to an FTP (File Transfer Protocol) client.

Software Upgrades and Installations

Large organizations often need to install new software or upgrade existing software on large numbers of desktop computer systems. For example, a new application may need to be installed or an operating system updated for a large number of desktop users. There are a few automated software upgrade systems, but the upgraded software must still be provided to the automated software upgrade system in the form a physical distribution medium or across the slow Internet. The directed broadcast system could be combined with an automated software upgrade system such that automated software upgrades could be broadcast by software providers across the high-bandwidth broadcast system of the present invention.

For example, a large software producer may discover a bug in an application that was purchased by a major corporation. To maintain good relations with the corporation or as part of a software maintenance subscription service, the software producer could broadcast a bug patch. The automated software upgrade system would then install the bug patch as soon as it is broadcast. The encryption features of the directed broadcast system would be used to ensure that patches are only sent from authenticated sources and only received by authorized subscribers.

New software can also be quickly distributed with the directed broadcast system of the present invention. For example, when a company signs a company wide license agreement for a particular software product, the company then must install the software product on all the desired systems. The directed broadcast system of the present invention can be used to quickly distribute a software product across all the sites of a company very quickly.

Pay-per-view Data Broadcasts

After a certain threshold number of receiver systems have been installed at various sites, certain "pay-per-view" data broadcasts could be offered to the general public. The encryption features of the directed broadcast system would be used to ensure that the pay-per-view data broadcasts are only received by paying customers. Any type of information could be distributed in this manner. For example, commercial software could be broadcast such that only paying customers would be able to decrypt and use the software. Similarly, entertainment programming such as pay-per-video could be delivered in a manner such that only paying customers could view the video.

A Directed Broadcast Service Offering

The teachings of the present invention disclose a system wherein a broadcast media can be easily shared by a large number of different data origination sources that desire the ability to broadcast information. To offer this capability to a large number of users, a packet switched data broadcasting service is introduced.

Private Broadcasting on Demand Service

Many corporations and institutions have geographically dispersed sites. At times, such entities may wish to broadcast private information that is to be received at all the entities' sites. For example, a corporation may wish to occasionally deliver an audio/video message to all employees at an "all hands meeting".

To accomplish such a goal, the entity could install receiver systems constructed according to the teachings of the present invention at all of the sites that should receive the audio/video message. When the all hands meeting begins, the headquarters would transmit the audio/video message as a digital stream to the broadcast control center 150 as illustrated in FIG. 1. The digital information stream sent to the broadcast facility would include quality of service level information such that the broadcast control center would handle the audio/video message appropriately. The digital information stream would further include a set of desired recipients that should receive the message. Furthermore, the digital stream would include an account number such that the broadcast control center 150 can track usage by each service subscriber.

The broadcast control center 150 encrypts the audio/video message in a manner such that only the desired recipients will be able to decrypt the message. The broadcast control center 150 then multiplexes the audio/video message into the broadcast signal that is transmitted using the broadcast medium. The receiver systems at each site receive and decrypt the audio/video message and distribute the audio/video message appropriately.

In an embodiment wherein the receiver system is coupled to a local area network as illustrated in FIG. 7, the audio/video message can be streamed onto the local area network 740. The streaming can be performed using a multicast audio/video streaming protocol such as RealVideo from RealNetworks of Seattle, Wash. or NetShow from Microsoft Corporation of Redmond, Wash. In this manner any client computer system coupled to the local area network 740 can access and view the audio/video message.

The broadcast control center 150 would charge the entity that requested the broadcast based upon a number of different broadcast parameters. Broadcast parameters that affect broadcast pricing may include: the number of bytes transmitted, the quality of service level provided, the encryption protection provided, the number of specified recipients, and the broadcast coverage area provided.

It should be noted that once an entity has installed receiver systems at its various sites, that entity can broadcast information to such sites at any time with no additional set-up. The entity simply transmits the information stream to be broadcast to the broadcast control center 150 when a broadcast is desired. Thus, the system of the present invention provides a "packet switched" broadcast system that may be shared by a large number of customers. However, from the perspective of each broadcast customer, the broadcast service appears private due to the encryption system inherent in the directed broadcast system.

Public Broadcasting on Demand Service

One a large number of receiver systems have been distributed, the directed broadcast system can be used to provide public broadcasts to all receiver systems. For example, a commercial software vendor may wish to provide a free trial version of a new software product to a large number of potential customers. Using the system of the present invention, the commercial software vendor may pay the broadcast control center 150 to broadcast the free trial version of the software product to many or all of the receiver systems that have been installed. Using the embodiment of FIG. 10, the receiver system could store the free trial version of the software product on the file system 1071. The free trial version of the software product would therefore be "pushed" to a large number of potential customers that have receiver systems. The potential customers can immediately try the free trial version of the software product without having to receive a CD-ROM or download the program across the Internet.

The foregoing has described a directed data broadcast system. It is contemplated that changes and modifications may be made by one of ordinary skill in the art, to the materials and arrangements of elements of the present invention without departing from the scope of the invention.

We claim:

1. A method of distributing digital information, said method comprising:

receiving a plurality of digital information streams from a plurality of broadcast clients;

encrypting each digital information stream to create a plurality of encrypted digital information streams;

multiplexing said plurality of encrypted digital information streams into a multiplexed digital information stream;

broadcasting said multiplexed digital information stream over a broadcast communication medium;

receiving said multiplexed digital information stream by a receiver unit;

demultiplexing said multiplexed digital information stream into said plurality of encrypted digital information streams; and decrypting only said encrypted digital information streams for which said receiver has encryption keys to retrieve at least one decrypted digital information stream.

2. The method of claim 1 wherein said broadcast communication medium comprises a satellite broadcast system.

3. The method of claim 1 wherein said broadcast communication medium comprises a terrestrial digital television broadcast system.

4. The method of claim 1 wherein encrypting each digital information stream comprises encrypting each said digital stream using an encryption key associated with a group of receiver systems allowed to receive said digital information stream.

5. The method of claim 1 wherein each digital information stream comprises Internet Protocol packets.

6. The method of claim 1 further comprising:
encapsulating said digital information stream into a transport protocol.

7. The method of claim 6 wherein said transport protocol comprises MPEG-2 transport protocol.

8. The method of claim 1 further comprising:
caching decrypted digital information on said receiver system.

9. The method of claim 8 further comprising:
serving said decrypted digital information cached on said receiver system to client systems coupled to said receiver system.

10. The method of claim 9 wherein said decrypted digital information cached on said receiver system comprises mark-up language display pages.

11. The method of claim 9 wherein said decrypted digital information cached on said receiver system comprises domain name service tables.

12. The method of claim 9 wherein said decrypted digital information cached on said receiver system comprises NNTP news.

13. The method of claim 1 further comprising:
multicasting said decrypted digital information stream on a local area network coupled to said receiver system.

14. The method of claim 13 wherein said decrypted digital information stream comprises a compressed stream of video information.

15. A method of providing broadcasting services for a fee, said method comprising:
receiving a payment from a first broadcast client;
receiving a first digital information stream from said first broadcast client;
multiplexing said first digital information stream with a plurality of other information streams from a plurality of other broadcast clients into a multiplexed broadcast information stream;
broadcasting said multiplexed broadcast information stream over a broadcast communication medium;
receiving said multiplexed broadcast information stream by a receiver unit; and
demultiplexing said multiplexed broadcast data stream to retrieve said first digital broadcast data stream.

16. The method of claim 15 wherein said broadcast communication medium comprises a satellite broadcast system.

17. The method of claim 15 wherein said broadcast communication medium comprises a terrestrial digital television broadcast system.

18. The method of claim 15 further comprising:
encrypting each digital information stream.

19. The method of claim 15 wherein encrypting each digital information stream comprises encrypting each said digital information stream using an encryption key associated with a group of receiver systems allowed to receive said digital information stream.

20. The method of claim 15 wherein each digital information stream comprises Internet Protocol packets.

21. The method of claim 15 further comprising:
encapsulating said digital information stream into a transport protocol.

22. The method of claim 21 wherein said transport protocol comprises MPEG-2 transport protocol.

23. The method of claim 15 further comprising:
caching decrypted digital information on said receiver system.

24. The method of claim 23 further comprising:
serving said decrypted digital information cached on said receiver system to client systems coupled to said receiver system.

25. The method of claim 24 wherein said decrypted digital information cached on said receiver system comprises mark-up language display pages.

26. The method of claim 15 further comprising:
multicasting said decrypted digital information stream on a local area network coupled to said receiver system.

27. The method of claim 26 wherein said decrypted digital information stream comprises a compressed stream of video information.

28. The method as claimed in claim 15, said method further comprising:
encoding each encrypted data stream with an adjustable forward error correction encoding system.

29. An digital broadcast receiver system, said receiver system comprising:
a broadcast reception system for receiving a broadcast signal;
a broadcast receiver system for tuning said broadcast signal;
a demodulator for demodulating said broadcast signal;
a decoder for decoding a multiplexed digital information stream from said broadcast signal;
a processor for identifying, extracting, and decrypting at least one digital information stream from said multiplexed digital information stream; and
a cache for storing said digital information stream.

30. The receiver system of claim 29 wherein said broadcast signal comprises a satellite broadcast signal.

31. The receiver system of claim 29 wherein said broadcast signal comprises a terrestrial digital television broadcast signal.

32. The receiver system of claim 29 wherein decrypting said digital information stream comprises decrypting said digital information stream using an encryption key associated with a group of receiver systems allowed to receive said digital information stream.

33. The receiver system of claim 29 wherein each digital information stream comprises Internet Protocol packets.

34. The receiver system of claim 33 wherein said digital information streams comprises multicast packets.

35. The receiver system of claim 29 further comprising:
   encapsulating said digital information stream into a transport protocol.

36. The receiver system of claim 35 wherein said transport protocol comprises MPEG-2 transport protocol.

37. The receiver system of claim 29 further comprising a server program for serving said decrypted digital information cached on said receiver system to client systems coupled to said receiver system.

38. The receiver system of claim 37 said client systems are coupled to said receiver system through a local area network.

39. The receiver system of claim 37 wherein said decrypted digital information cached on said receiver system comprises mark-up language display pages.

40. The receiver system of claim 37 wherein said decrypted digital information cached on said receiver system comprises domain name service tables.

41. The receiver system of claim 37 wherein said decrypted digital information cached on said receiver system comprises NNTP news.

42. The receiver system of claim 29 further comprising:
   a network interface, said network interface for multicasting said decrypted digital information stream to a local area network coupled to said receiver system.

43. The method of claim 42 wherein said decrypted digital information stream comprises a compressed stream of video information.

* * * * *